(12) United States Patent
Norton

(10) Patent No.: US 10,596,851 B2
(45) Date of Patent: *Mar. 24, 2020

(54) BEAD LOCK SYSTEMS AND METHODS

(71) Applicant: Patrick Norton, Manor, TX (US)

(72) Inventor: Patrick Norton, Manor, TX (US)

(\*) Notice: Subject to any disclaimer, the term of this patent is extended or adjusted under 35 U.S.C. 154(b) by 0 days.

This patent is subject to a terminal disclaimer.

(21) Appl. No.: 16/140,077

(22) Filed: Sep. 24, 2018

(65) Prior Publication Data

US 2019/0023067 A1    Jan. 24, 2019

Related U.S. Application Data

(63) Continuation of application No. 15/903,286, filed on Feb. 23, 2018, now Pat. No. 10,112,438, which is a continuation of application No. 15/092,528, filed on Apr. 6, 2016, now Pat. No. 9,937,748.

(60) Provisional application No. 62/145,281, filed on Apr. 9, 2015.

(51) Int. Cl.
*B60B 25/20* (2006.01)
*B60B 25/10* (2006.01)

(52) U.S. Cl.
CPC .............. *B60B 25/10* (2013.01); *B60B 25/20* (2013.01); *B60B 2310/30* (2013.01); *B60B 2310/305* (2013.01); *B60B 2320/10* (2013.01); *B60Y 2200/81* (2013.01)

(58) Field of Classification Search
CPC ..... B60B 25/10; B60B 25/20; B60B 2310/30; B60B 2310/305; B60B 2320/10; B60B 25/14; B60B 25/18; B60B 23/10; B60B 25/04; B60Y 2200/81

USPC ......................................... 152/398, 396, 397

See application file for complete search history.

(56) References Cited

U.S. PATENT DOCUMENTS

| 2,367,823 | A  | * | 1/1945  | Brink ...................... B60B 25/20 152/411 |
| 4,989,657 | A  | * | 2/1991  | Lipper ..................... B60B 25/04 152/396 |
| 6,000,762 | A  | * | 12/1999 | Chang ...................... B60B 3/08 152/DIG. 10 |
| 7,083,238 | B2 | * | 8/2006  | Clements ................ B60B 23/10 152/396 |
| 7,438,366 | B2 | * | 10/2008 | Machamer .............. B60B 3/008 152/396 |
| 8,505,598 | B2 | * | 8/2013  | Marsaly .................. B60B 25/22 152/396 |
| 8,925,604 | B2 | * | 1/2015  | Putz ........................ B60B 23/06 152/405 |
| 9,937,748 | B2 | * | 4/2018  | Norton ..................... B60B 25/10 |
| 2003/0080609 | A1 | * | 5/2003 | Darnell ...................... B60B 5/02 301/95.11 |
| 2010/0231020 | A1 | * | 9/2010 | Kim .......................... A47C 3/30 297/344.19 |

\* cited by examiner

*Primary Examiner* — S. Joseph Morano
*Assistant Examiner* — Jean W Charleston
(74) *Attorney, Agent, or Firm* — Pierson IP, PLLC

(57) ABSTRACT

Embodiments disclosed herein describe systems and methods for a bead lock wheel line in scaled vehicles. The bead lock wheel line may include a wheel center section and a bead lock ring. The bead lock ring may be configured to be overlaid on the wheel center section, wherein screws may be inserted through orifices positioned within the bead lock ring and into orifices positioned on the wheel center section.

13 Claims, 29 Drawing Sheets

REPLACEMENT SHEET

BEAD LOCK SYSTEMS AND METHODS

CROSS-REFERENCE TO RELATED APPLICATIONS

This application claims a benefit of priority under 35 U.S.C. § 119 to Provisional Application No. 62/145,281 filed on Apr. 9, 2015, which is fully incorporated herein by reference in its entirety.

BACKGROUND INFORMATION

Field of the Disclosure

Examples of the present disclosure are related to bead lock systems and methods. More particularly, embodiments relate to a bead lock system with a wheel center and a bead lock ring, wherein threaded holes in the wheel center are configured to align with pass through holes in the bead lock ring, and pass through holes in the wheel center are configured to align with threaded holes in the bead lock ring.

Background

A model vehicle or toy vehicle is a miniature representation of an automobile or other vehicle. Conventionally, scaled miniatures of real production vehicles are created and distributed as kits. Over time, kits have been created with incredible levels of accuracy, wherein the kits include detail and parts unseen when the model is complete.

One such area of accuracy is on the wheel hub assembly of the model vehicle. Conventionally, a wheel hub assembly is an automotive part used in most vehicles, which is used to mount a wheel on the vehicle. A bead lock is a mechanical device that secures the bead of a tire to the wheel hub of a vehicle. Tires and wheels are design so that, when the tire is inflated or filled with foam, the tire pressure pushes the bead of the tire against the inside of the wheel so that the tire stays on the wheel, allowing the two to rotate together. In situations where tire pressure is insufficient to hold the tire in place, a bead lock is needed. Bead locks include a ring with a number of bolts around the circumference of the ring. The bolts are used to clamp the tire to the wheel.

Conventionally, when mounting a scaled tire to a bead lock wheel, multi-piece wheels are used. In the multi-piece wheels, a first portion may be a bead lock wheel and a second portion may be a bead lock ring. In conventional kits, there may only be a few screws that are used to couple the first and second portion of the wheel. However, for modeling purposes, utilizing only a few screws does not create a realistic scaled model because a 1:1 bead lock wheel and ring utilizes many nuts and bolts.

Another option when mounting a scaled tire to a bead lock wheel is to utilize a bead lock wheel and bead lock ring with many screws that are threaded through the bead lock wheel and the bead lock ring. However, requiring many full screws to be fully threaded through the bead lock wheel and the bead lock ring greatly increases the time required to assemble and disassemble the scaled model.

Accordingly, needs exist for more effective and efficient systems and methods for creating scaled models of bead lock wheel lines.

SUMMARY

Embodiments disclosed herein describe systems and methods for a bead lock wheel line in scaled vehicles. The bead lock wheel line may include a wheel center section and a bead lock ring. The bead lock ring may be configured to be overlaid on the wheel center section, wherein screws may be inserted through orifices positioned within the bead lock ring and into orifices positioned on the wheel center section. Responsive to inserting the screws through the orifices positioned within the bead lock ring into the orifices positioned on the wheel center section, the bead lock ring may be coupled to the wheel center section.

In embodiments, foam may be utilized instead of air to inflate the tire. The foam may come in a plurality of different types, sizes, densities, etc. based on the type of terrain tire selection, vehicle, temperature, etc. Additionally, weight may be used on the inside of the bead lock wheel line based on a plurality of factors. Due to the type of foam and/or weights used with the wheels of scaled vehicles, users frequently change tires, foams, add weights, remove weights, etc. to the inside of the tire. Accordingly, assembly and disassembly of wheel lines in scaled vehicles occur frequently.

The wheel center section may include a plurality of threaded holes and a plurality of pass through holes. In embodiments, within the wheel center section there may be more pass through holes than threaded holes.

The bead lock ring may include a plurality of threaded holes and a plurality to pass through holes. In embodiments, within the bead lock ring there may be more threaded holes than pass through holes.

In embodiments, threaded screws may be configured to be inserted into the plurality of threaded holes and the plurality of pass through holes. However, because each threaded hole, whether positioned on the wheel center section or the bead lock ring, is aligned with a pass through hole, only a portion of the screw will be coupled via threads to the bead lock wheel line. Whether the upper portion of the screw or the lower portion of the screw is coupled via threads may be based on whether the screw is inserted into a threaded hole or pass through hole on the bead lock ring.

By utilizing threaded screws to secure the bead lock ring to the wheel center section via threaded and pass through orifices, the bead lock wheel line may minimize the amount of time required for an end user to dissemble and/or reassemble the bead lock wheel lines. As embodiments may be utilized with scaled vehicles and not real vehicles, it may not be required to have threaded screws fully interfaced with threaded holes. However, the visual appearance of embodiments may be important. Because of the additional threaded holes in the bead lock rings and matching pass through holes in the wheel center section, the bead lock wheel line may maintain the visible appearance of many threaded screws being fully interfaced with threaded holes. Accordingly, the bead lock wheel line may be created to scale of a conventional vehicle utilizing the same type of screws being inserted into portions of threaded holes and the pass through holes.

In embodiments, the wheel center section may include a first number of threaded holes, and a second number of pass through holes. The bead lock ring may include the second number of pass through holes, and the first number of threaded holes.

The threaded holes in the wheel center section may be configured to receive hardware that passes through the pass through holes on the bead lock ring. The threaded holes in the wheel may be configured to secure the bead lock ring to the wheel center section.

The threaded holes in the bead lock ring may be configured to allow hardware to be threaded into the bead lock ring, while passing through the wheel center section without requiring additional assembly or disassembly. In embodiments, each bead lock ring may include threaded holes, wherein hardware may be threaded directly into the bead lock ring, while freely passing into the pass through holes of the wheel center section.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
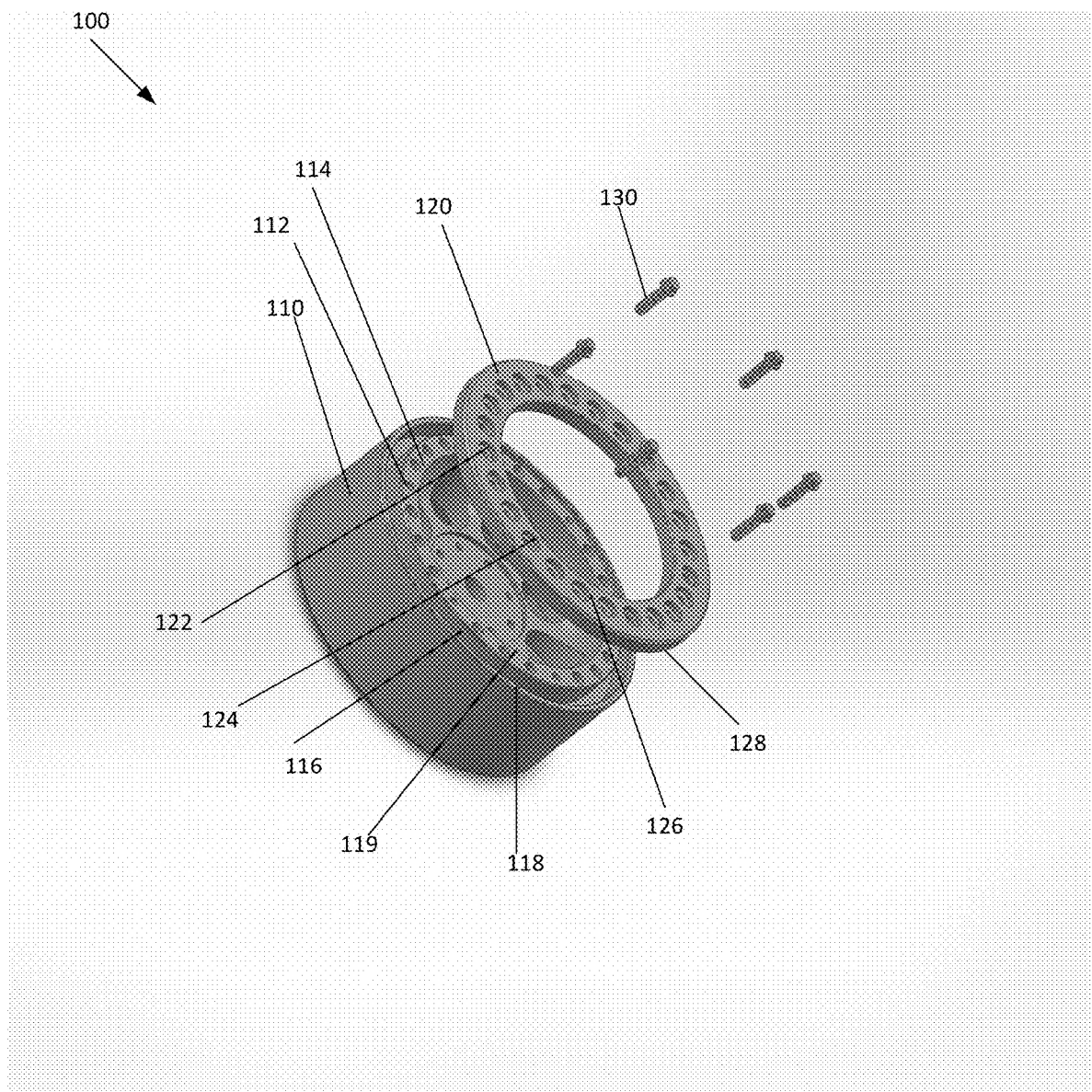
FIG. 1 depicts one embodiment of a bead lock wheel line.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Embodiments disclosed herein describe systems and methods for a bead lock wheel line in scaled vehicles. The bead lock wheel line may include a wheel center section and a bead lock ring. The bead lock ring may be configured to be overlaid on the wheel center section, wherein screws may be inserted through orifices positioned within the bead lock ring and into orifices positioned on the wheel center section.

FIG. 1 depicts one embodiment of a bead lock wheel line 100. Bead lock wheel line 100 may be configured to be a scaled version of a wheel of a conventional vehicle. In embodiments, bead lock wheel line 100 may be configured to represent an exact replica of a vehicle in production. Bead lock wheel line 100 may include a wheel center section 110, a bead lock ring 120, and hardware 130.

Wheel center section 110 may be a support for a wheel, when the wheel of the replicated vehicle is coupled with the body of the replicated vehicle. Wheel center section 110 may be configured to have an outer circumference 118 of a first diameter, an inner circumference 119 of a second diameter, channel 116, a plurality of threaded holes 112, and a plurality of pass through holes 114.

The inner circumference 119 of wheel center section 110 may be a projection positioned on a face of wheel center section 110. In embodiments, channel 116 may be formed between outer circumference 118 and inner circumference 119, wherein channel 116 is defined by the sidewalls of outer circumference 118 and inner circumference 119.

On the face of inner circumference 119 may be the plurality of threaded holes 112 and the plurality of pass through holes 114. Each of the plurality of threaded holes 112 may be a tapped hole that is configured to receive hardware 130. The threaded holes 112 may include a helical structure used to convert toque into linear force. As hardware 130 is rotated, hardware 130 moves along its axis through a threaded hole 112. Utilizing threading holes 112 the surface area of adjacent space between threaded hole 112 and hardware 130 may increase. In embodiments, threaded holes 112 positioned on the face of inner circumference 119 may not be positioned adjacent to other threaded holes 112.

Pass through holes 114 may be cylindrical channels with substantially smooth sidewalls. Pass through holes 114 may allow hardware 130 to enter into wheel center section 110 without hardware 130 directly contacting the sidewalls of pass through holes 114. Accordingly, pass through holes 114 may be channels, grooves, etc. configured to be a housing for hardware 130. In embodiments, the diameter of threaded holes 112 may be smaller than the diameter of pass through holes 114. In embodiments, pass through holes 114 on inner circumference 119 may be positioned adjacent to at least one other pass through hole 114.

Bead lock ring 120 may be configured to be secured adjacent to the face of wheel center portion 110. Bead lock ring 120 may include face 126, projection 128, threaded holes 122, and pass through holes 124.

A lower surface of face 126 of bead lock ring 120 may be configured to be positioned adjacent to inner circumference 119 of wheel center portion 110. In embodiments, projection 128 positioned on the outer circumference of bead lock ring 120, and may be configured to align and be inserted into channel 116.

On the face 126 may be the plurality of threaded holes 122 and the plurality of pass through holes 124. Each of the plurality of threaded holes 122 may be a tapped hole that is configured to receive hardware 130. The threaded holes 122 may include a helical structure used to convert toque into linear force. As hardware 130 is rotated, hardware 130 moves along its axis through a threaded hole 122. Utilizing threading holes 122, the surface area of adjacent space between threaded hole 122 and hardware 130 may increase. In embodiments, threaded holes 122 positioned on bead lock ring 120 may not be positioned adjacent to other threaded holes 122 positioned on bead lock ring 124.

Pass through holes 124 may be cylindrical channels with substantially smooth sidewalls. Pass through holes 124 may allow hardware 130 to enter into bead lock ring 120 without hardware 130 directly contacting the sidewalls of pass through holes 124. Accordingly, pass through holes 124 may be channels, grooves, etc. configured to be a housing for hardware 130. In embodiments, the diameter of threaded holes 122 may be smaller than the diameter of pass through holes 124. In embodiments, pass through holes 124 on bead lock ring may be positioned adjacent to at least one other pass through holes 124.

In embodiments, when positioning bead lock ring 120 on wheel center section 110, threaded holes 112 on wheel center section 110 may be configured to align with pass through holes 124 on bead lock ring 120. Additionally, pass through holes 114 on wheel center section 110 may be configured to align with threaded holes 122 on bead lock ring. As such, the first number of threaded holes 112 on wheel center section 110 may be equal to the number of pass through holes 124 on bead lock ring 120, while a second number of pass through holes 114 on wheel center section 110 may be equal to the number of threaded holes 122 on bead lock ring 120.

Hardware 130 may be a fastener that includes a helical ridge, thread, etc. wrapped around a cylinder. Hardware 130 may be configured to interface with threaded holes 112, 122, to couple wheel center section 110 and bead lock ring 120. Hardware 130 may have a head that is configured to be positioned adjacent to bead lock ring 120 when hardware 130 is inserted into bead lock ring 120. In embodiments, the same hardware 130 may be configured to couple bead lock ring 120 and wheel center section 110.

In embodiments, only a portion of hardware 130 may be configured to be threaded into bead lock wheel line 100. Hardware 130 may be configured to be inserted into the plurality of threaded holes 112, 122 and the plurality of pass through holes 114, 124. However, because threaded holes 112 are configured to align with pass through holes 124, and threaded holes 122 are configured to align with pass through holes 114, only a portion of the hardware 130 will be coupled via threads to the bead lock wheel line 100.

For example, when hardware 130 is threaded into threaded hole 112, only the bottom half of hardware 130 may be directly interfacing with bead lock wheel line 100, while the top half of hardware 130 is merely inserted through pass through hole 124. Alternatively, when hardware 130 is threaded into threaded hole 122 only the top half of hardware 130 may be directly interfacing with bead lock wheel line 100, while the bottom half of hardware 130 is merely inserted through pass through hole 114. By allowing the same hardware 130 to be inserted through threaded holes 122 and pass through holes 124, bead lock wheel line 100 may maintain the visible appearance of many bolts, fasteners, screws, etc. of a conventional vehicle. Furthermore, when hardware 130 is inserted into the pass through holes 114, 124, hardware 130 may not touch the sidewalls of the pass through holes 114, 124.

Figure 2:
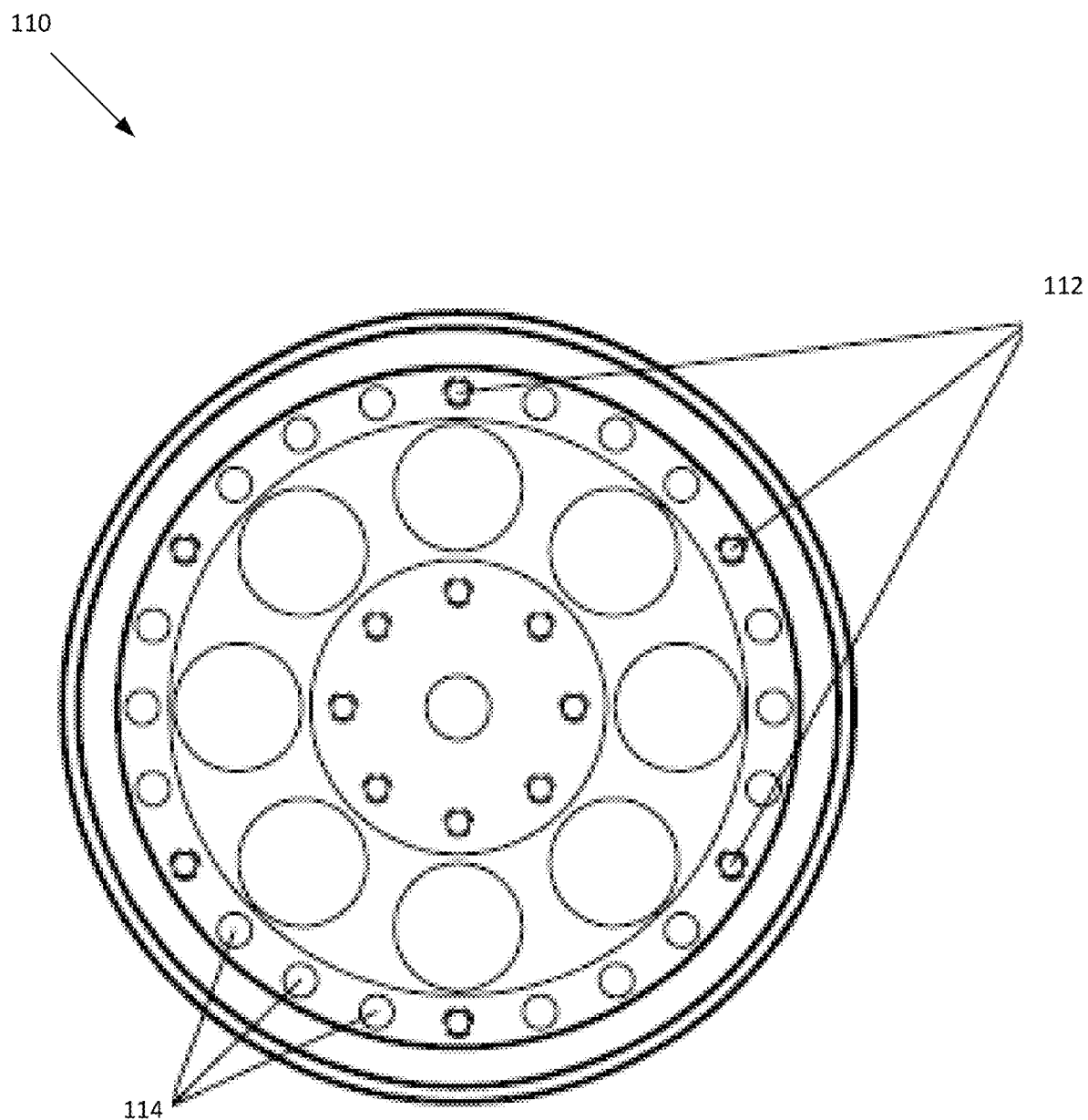
FIG. 2 depicts one embodiment of a top view of a wheel center portion.

FIG. 2 depicts one embodiment of a top view of wheel center portion 110. As depicted in FIG. 2, wheel center portion 110 may have eighteen pass through holes 114 and six threaded holes 112, wherein the pass through holes 114 may have a greater diameter than threaded holes 112. The threaded holes 112 may be positioned between pass through holes 114, wherein a plurality of pass-through holes 114 may be positioned between pairs of threaded holes 112.

Figure 3:
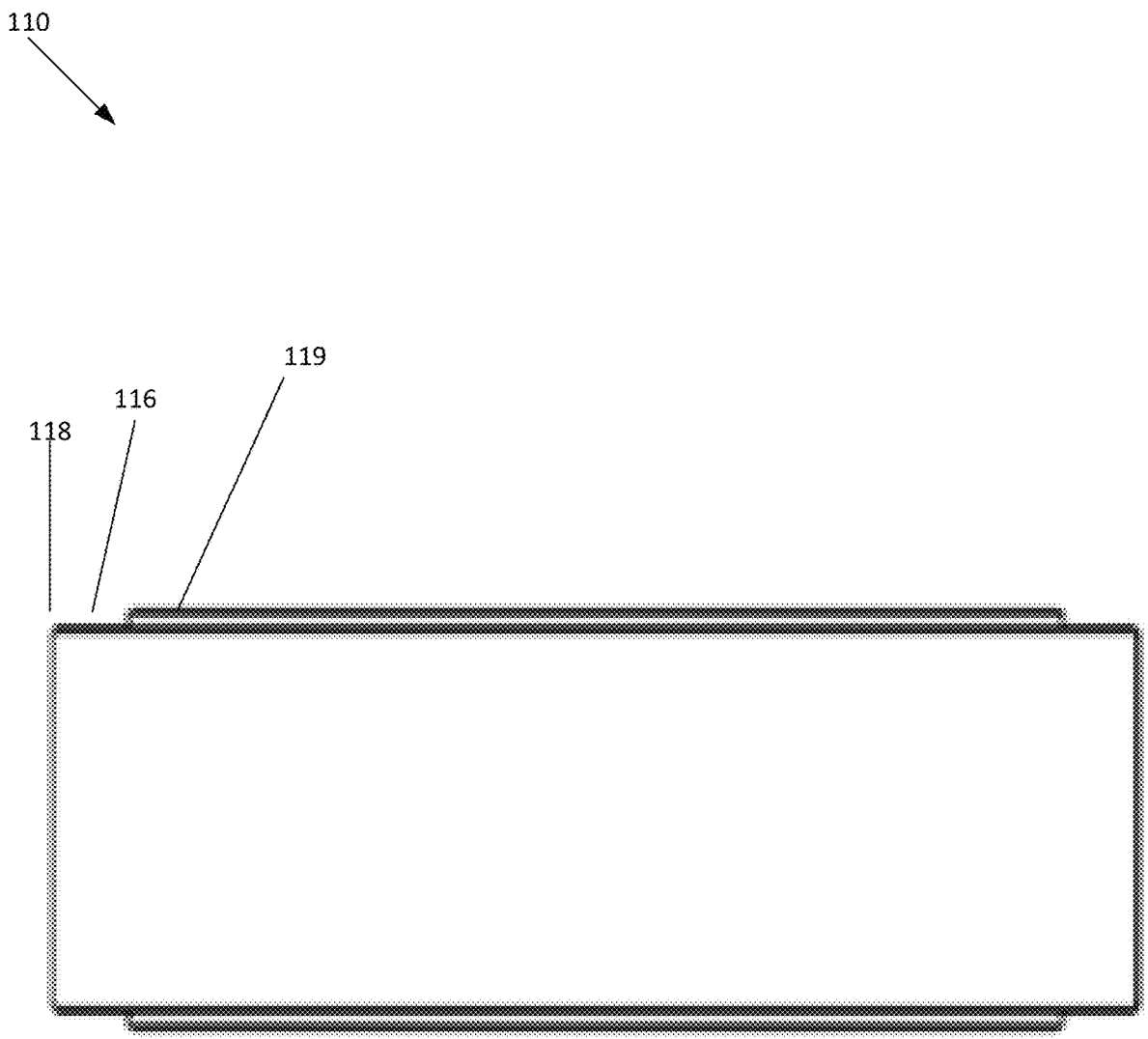
FIG. 3 depicts one embodiment of a side view of a wheel center portion.

FIG. 3 depicts one embodiment of a side view of wheel center portion 110. As depicted in FIG. 3, the inner circumference 119 of wheel center portion 110 may be slightly elevated from the outer circumference 118 of wheel center portion 110.

Figure 4:
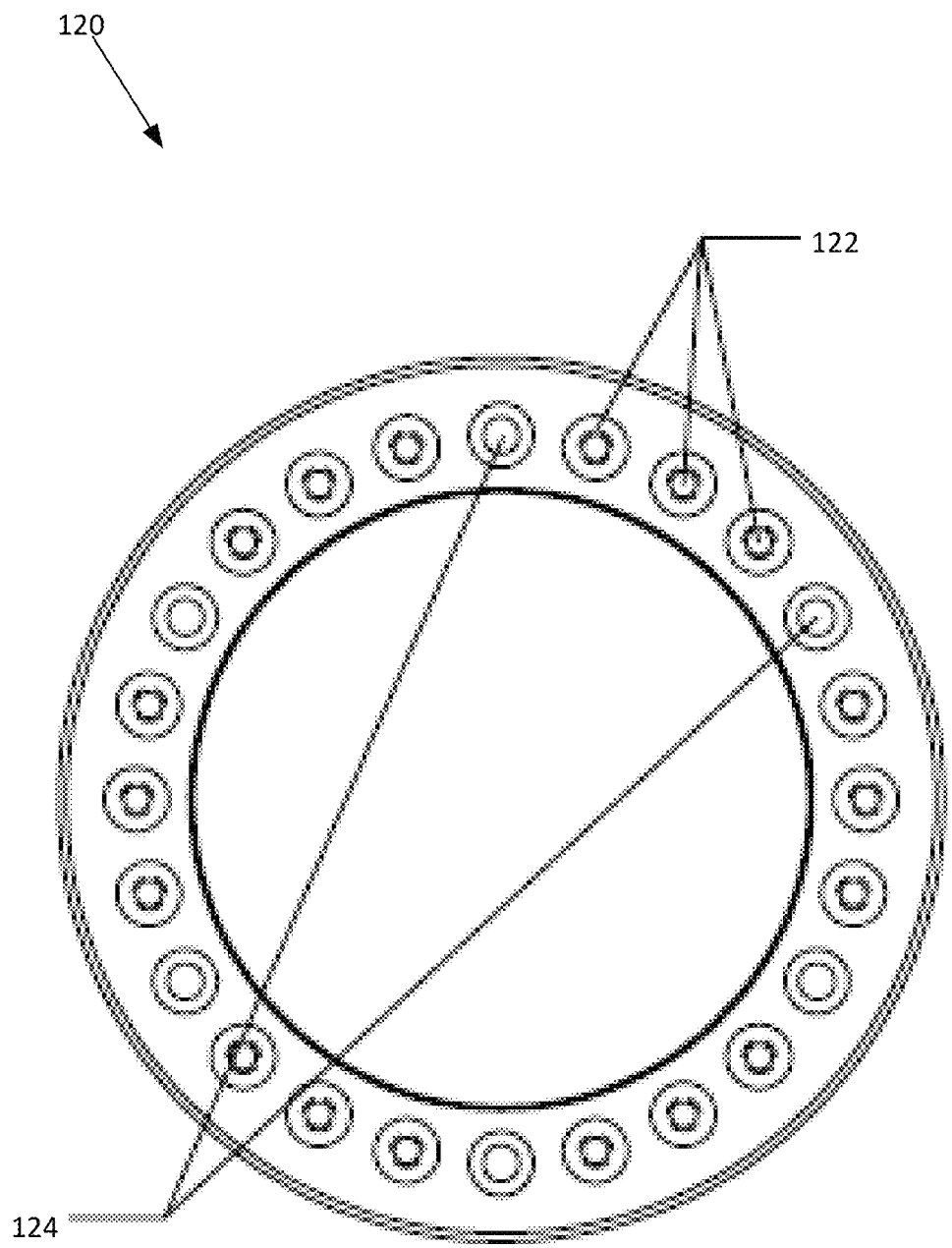
FIG. 4 depicts one embodiment of a top view of a bead lock ring.

FIG. 4 depicts one embodiment of a top view of bead lock ring 120. As depicted in FIG. 4, bead lock ring 120 may have eighteen threaded holes 122 and six pass through holes 122, wherein the pass through holes 124 may have a greater diameter than threaded holes 122. The pass through holes 124 may be positioned between threaded holes 122, wherein a plurality of threaded holes 122 may be positioned between pairs of pass through holes 124.

Figure 5:
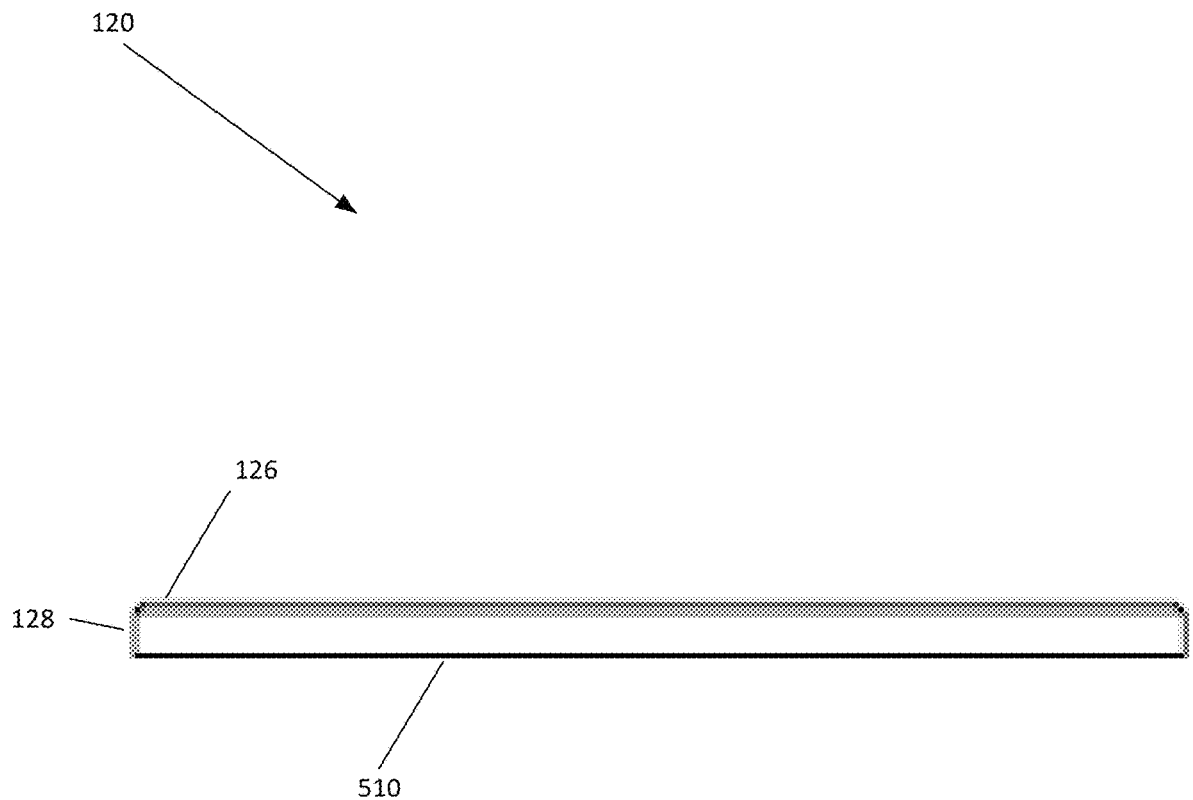
FIG. 5 depicts one embodiment of a side view of a bead lock ring.

FIG. 5 depicts one embodiment of a side view of bead lock ring 120. As depicted in FIG. 5, the top face 126 of bead lock rink 120 may have a smaller diameter than the base 510 of bead lock ring 120. Accordingly, base 510 may be configured to be disposed within groove 116, while the circumference of top face 126 may be configured to be positioned over inner circumference 119 of wheel center portion 110.

Furthermore, as depicted in FIG. 5, projection 128 of bead lock ring 120 may have an angled, curved, sloped, etc. top portion to change the diameter of base 510 and top face 126. Due to the curvature of the top portion of projection 128, base 510 may have a wider diameter than top face 126.

Figure 6:
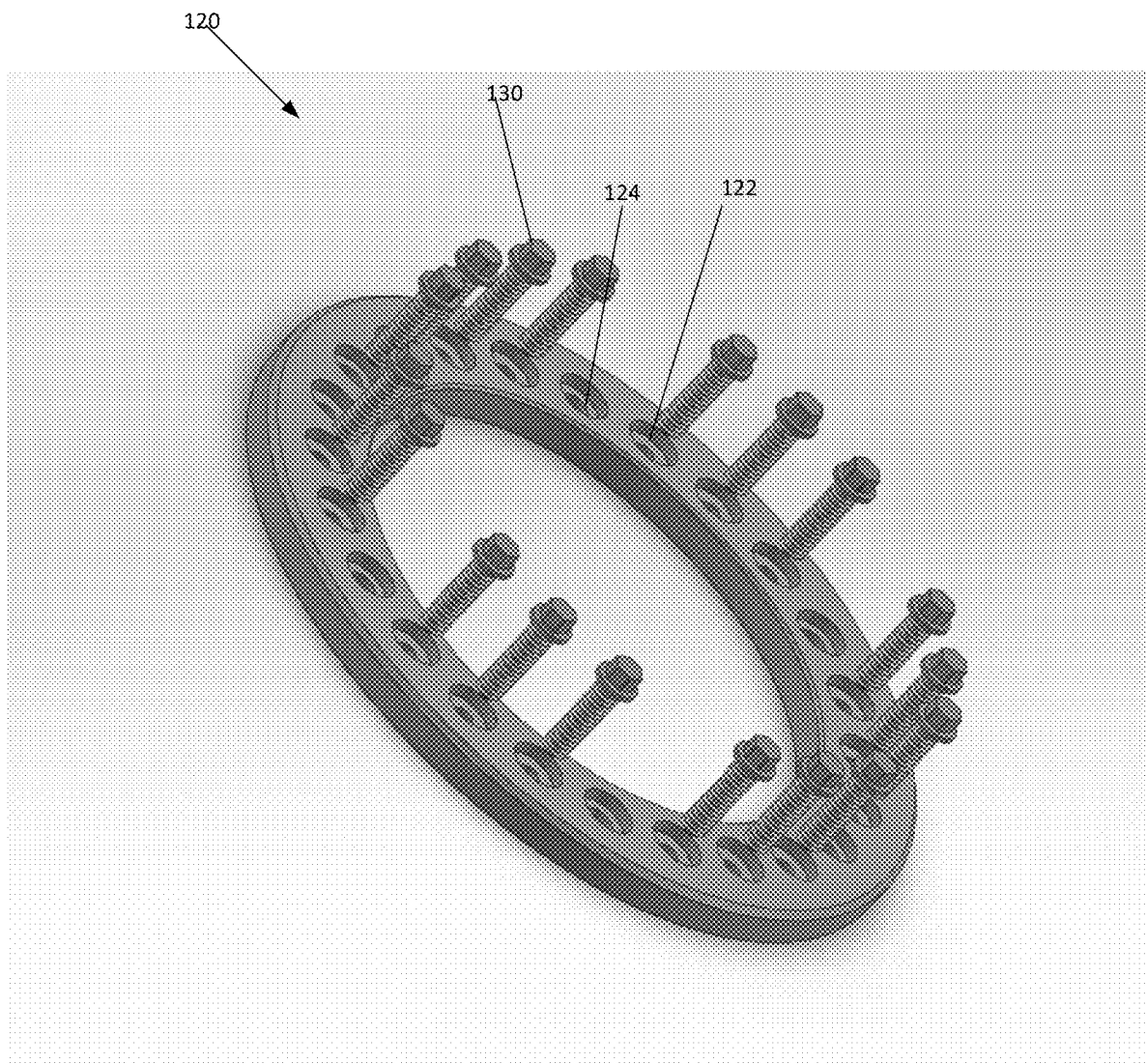
FIG. 6 depicts one embodiment of a bead lock ring.

FIG. 6 depicts one embodiment of bead lock ring 120, wherein hardware 130 is being inserted into threaded holes 122. As depicted in FIG. 6, eighteen threaded screws may be inserted into threaded holes 122, wherein each of the hardware 130 is substantially similar.

Figure 7:
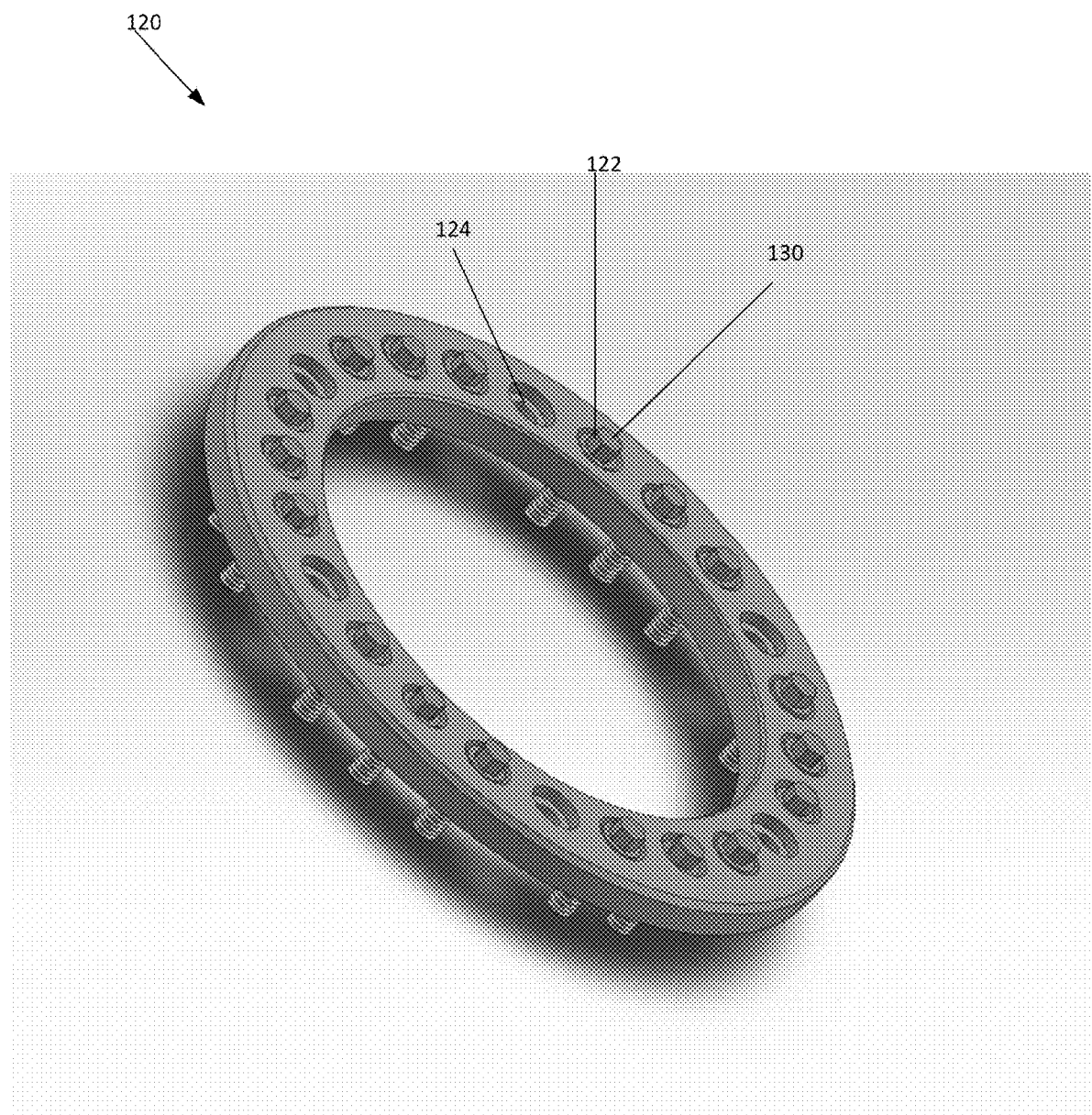
FIG. 7 depicts the top portion of the threaded screws may be screwed into threaded holes, according to an embodiment.

As depicted in FIG. 7, the top portion of the threaded screws may be screwed into threaded holes 122. However, the bottom, exposed portion of the threaded screws may be merely inserted into pass through holes positioned on a center wheel portion. Accordingly, a user may only need to screw in a portion of hardware 130 into bead lock wheel line 100. In embodiments, when hardware 130 is inserted into threaded holes, the threads associated within hardware 130 may be interfaced with the threads on the threaded holes. However, when hardware 130 is inserted into pass through holes, the threads may not touch the sidewalls of the pass through holes.

Figure 8:
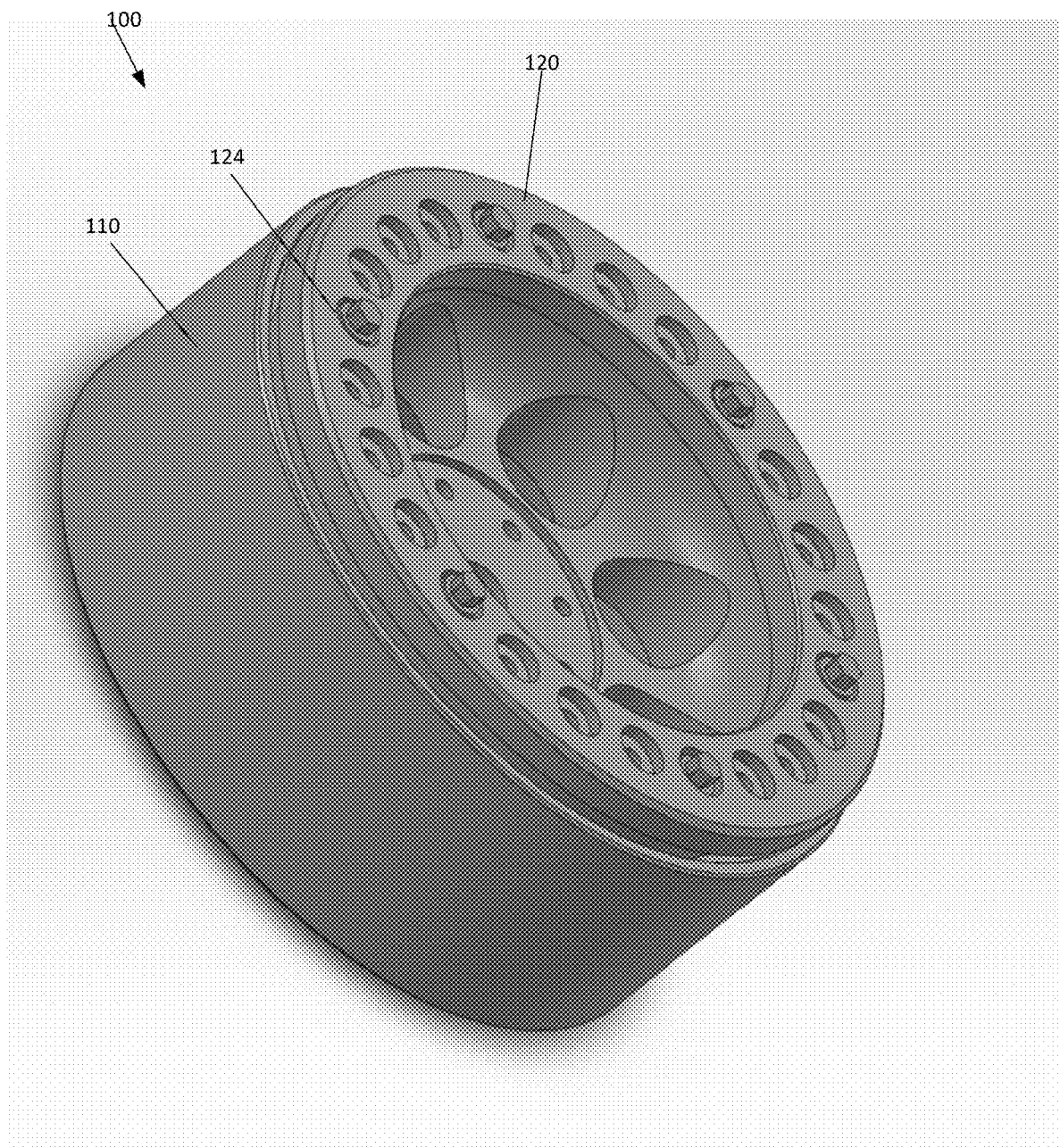
FIG. 8 depicts six threaded screws inserted through the pass through holes within bead lock ring, according to an embodiment.

As depicted in FIG. 8, six threaded screws may be inserted through the pass through holes 124 within bead lock ring 120. Upon inserted the hardware 130 into the pass through holes 124, the hardware 130 may be screwed into threaded holes 112. Accordingly, only the bottom portion of hardware 130 may be screwed into bead lock wheel line 100, while the top portion of hardware 130 may be merely pass through pass through holes 124.

Figure 9:
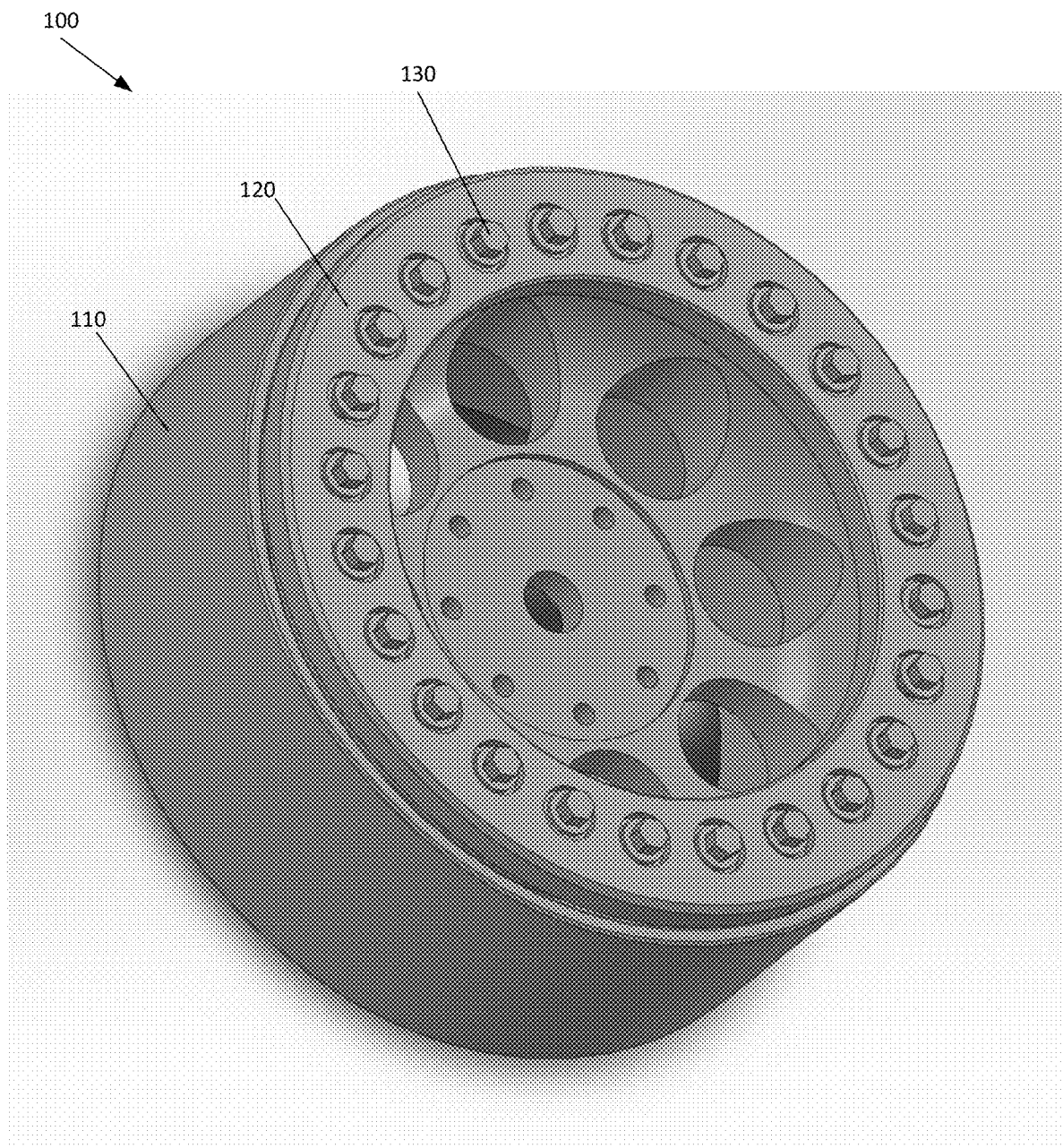
FIG. 9 depicts one embodiment of a bead lock wheel line.

FIG. 9 depicts one embodiment of bead lock wheel line 100. As depicted in FIG. 9, there are a plurality of even spaced hardware 130 that are coupled the bead lock wheel line 100. Because bead lock wheel line 100 allows the same hardware 130 to be inserted into bead lock ring 120 and wheel center portion 110, the face of bead lock wheel line 100 has a uniform lock.

Figure 10:
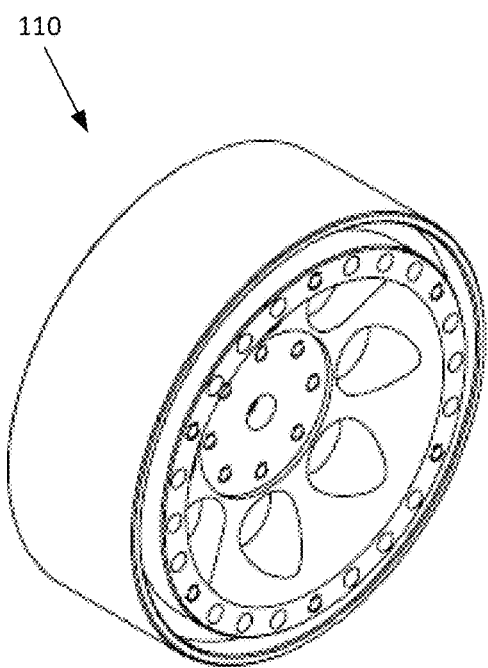
FIG. 10 depicts one embodiment of a perspective view of a wheel center portion.
Figure 11:
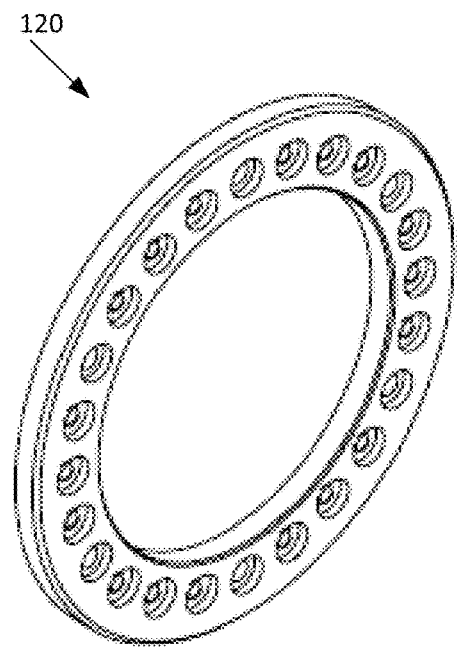
FIG. 11 depicts one embodiment of a bead lock ring.

FIG. 10 depicts one embodiment of a perspective view of wheel center portion 110, and FIG. 11 depicts one embodiment of bead lock ring 120. Although bead lock ring 120 is depicted with eighteen threaded holes 122 and six pass through holes 124 and wheel center portion 110 is depicted with six threaded holes 112 and six pass through holes 114, one skilled in the art will appreciate that wheel center portion 110 and bead lock ring 120 may have any number of corresponding pass through holes and threaded holes.

Figure 12:
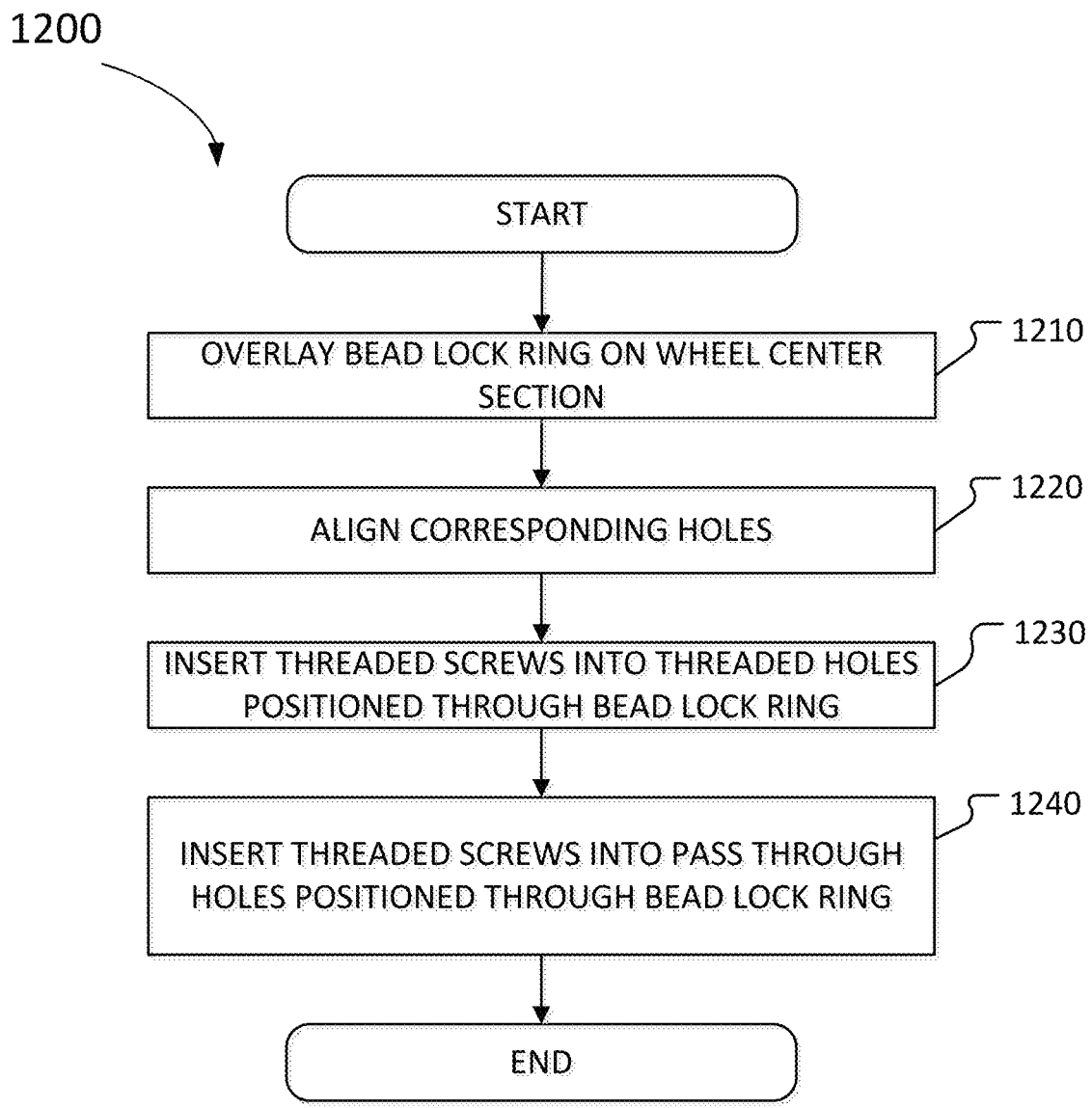
FIG. 12 depicts one embodiment of utilizing a bead lock wheel line.
Figure 13:
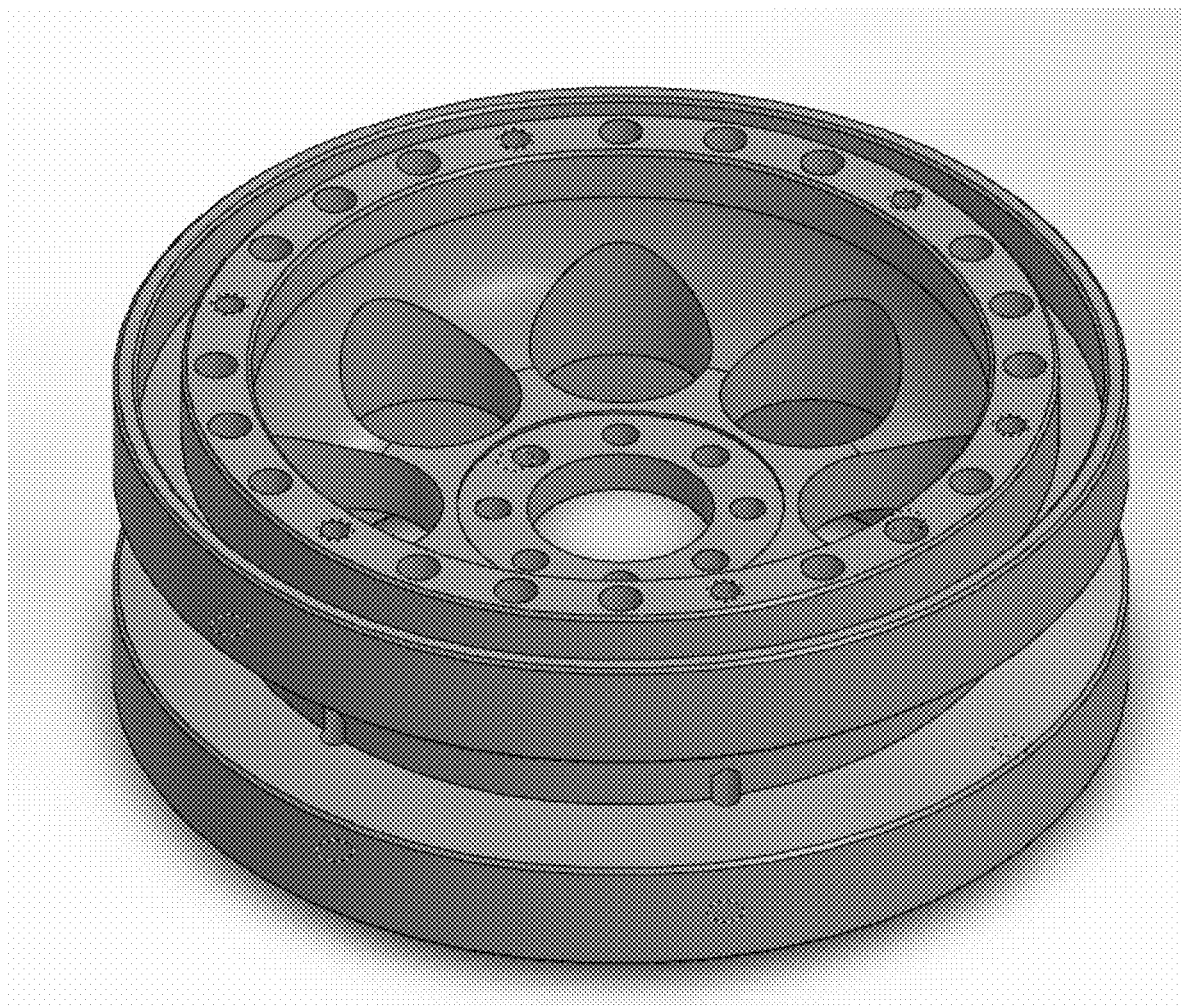
FIGS. 13-16 depict a various views of a wheel center section of a bead lock wheel line, according to an embodiment.
Figure 14:
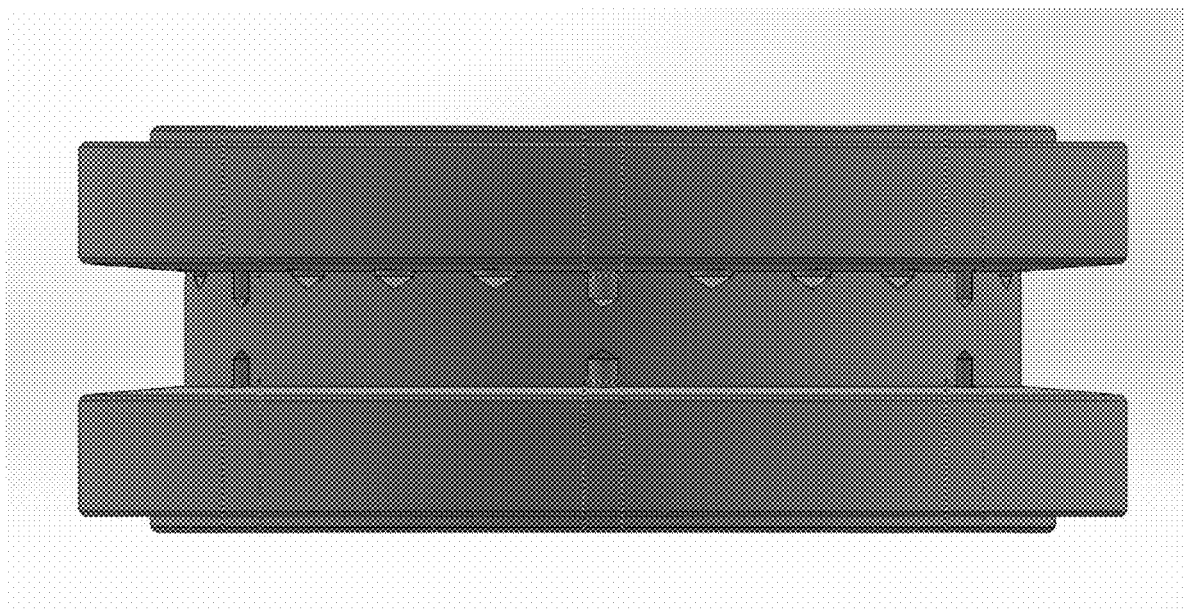
Figure 15:
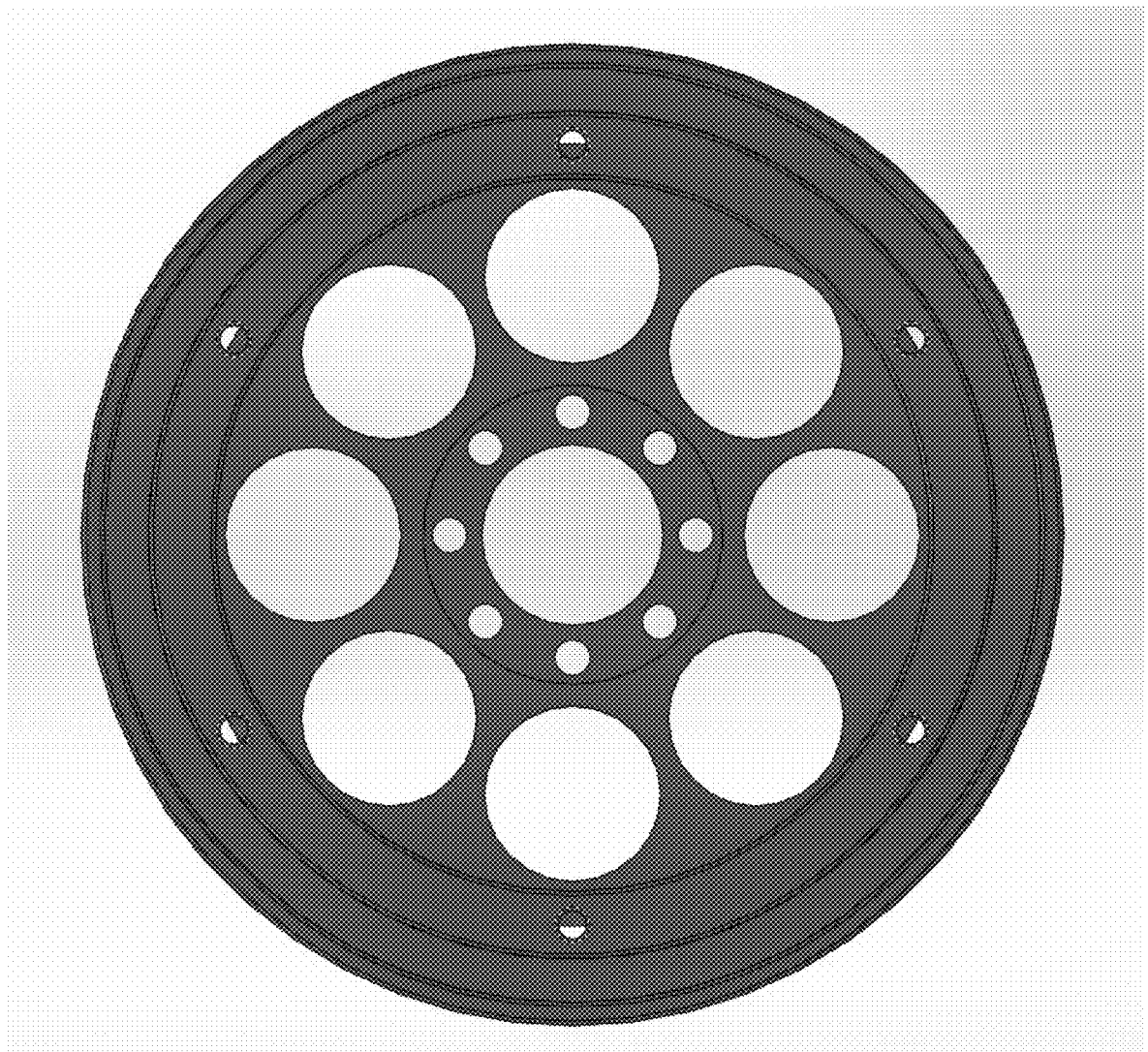
Figure 16:
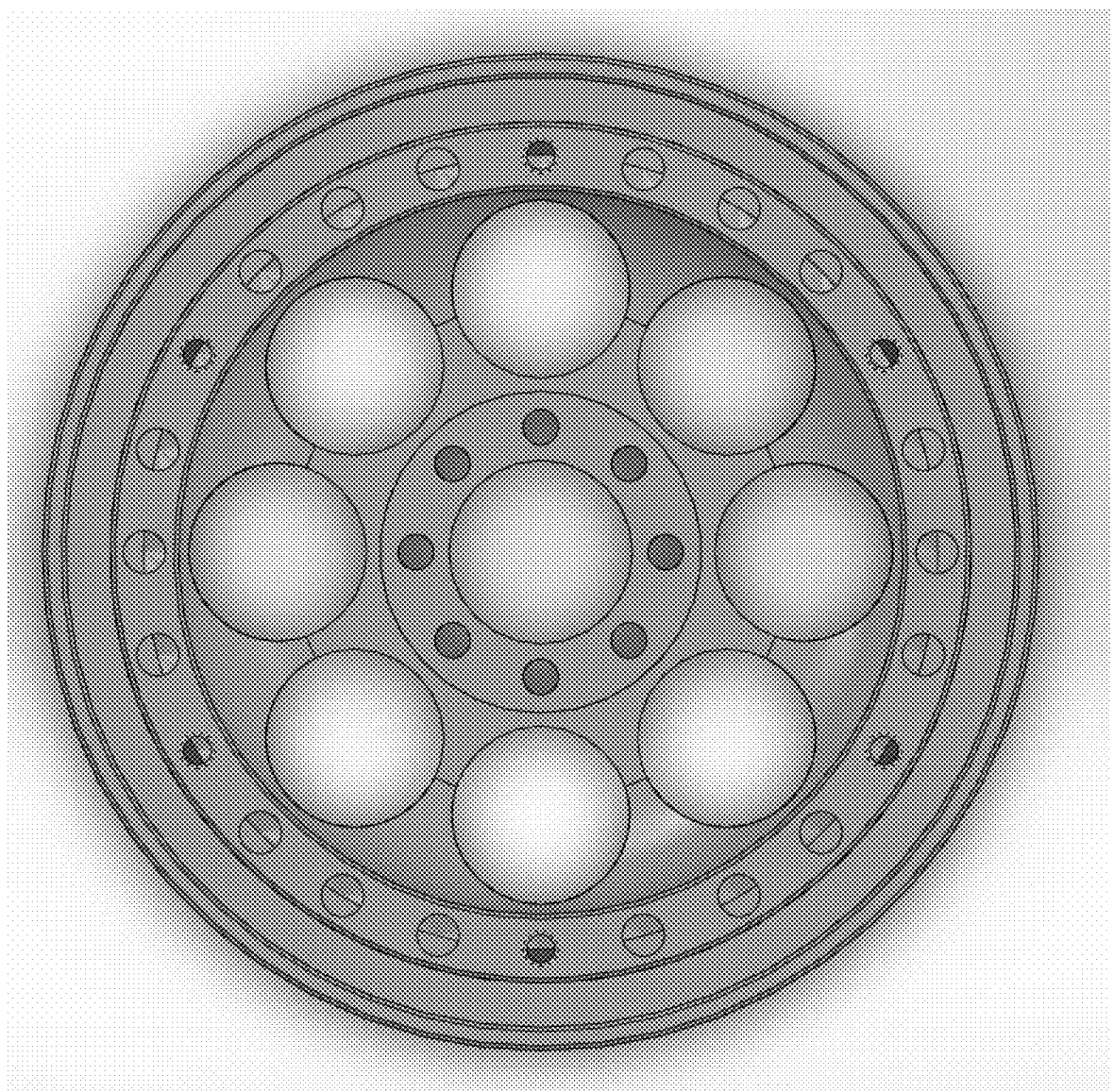
Figure 17:
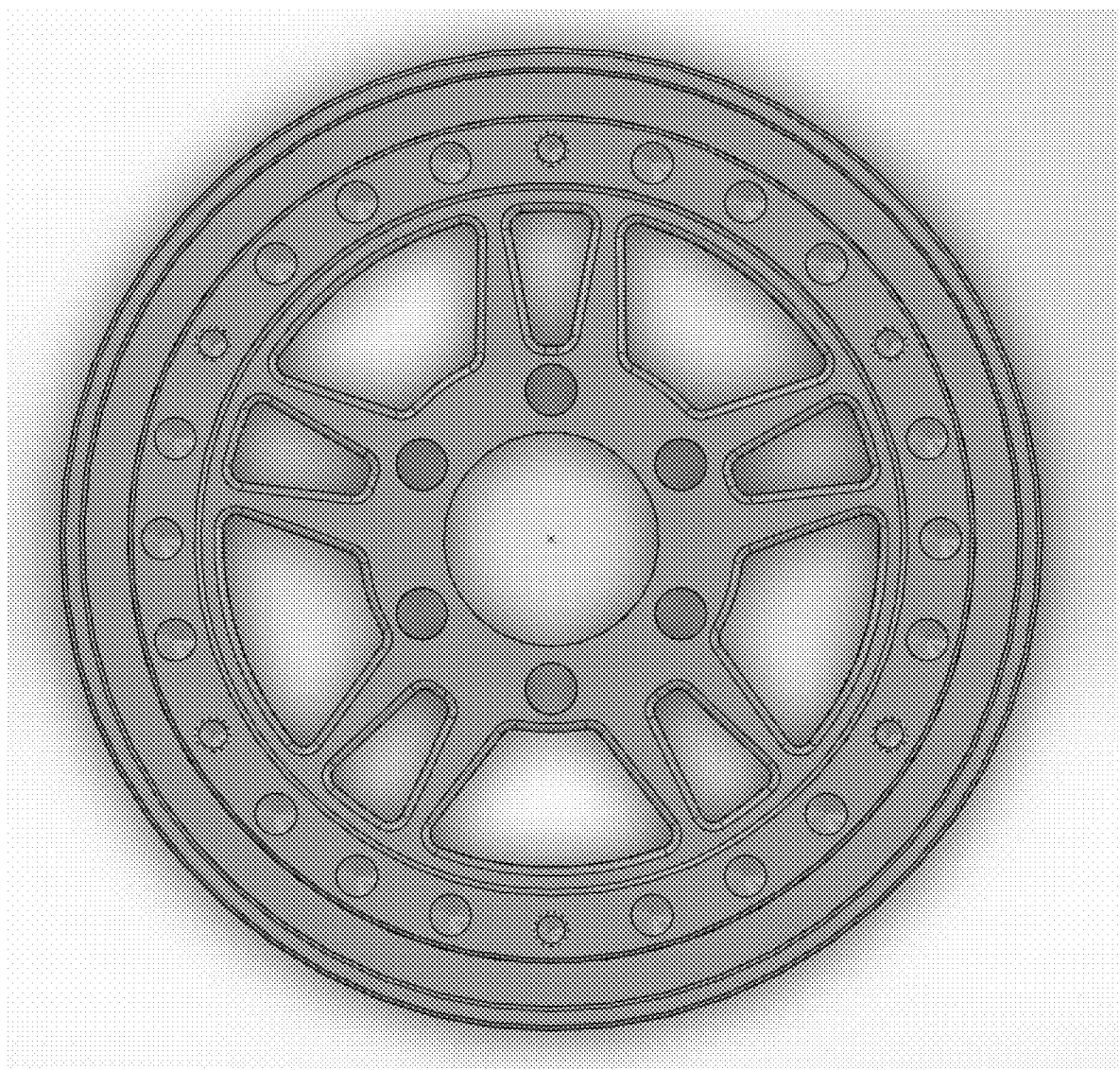
FIGS. 17-20 depict a various views of a wheel center section of a bead lock wheel line, according to an embodiment.
Figure 18:
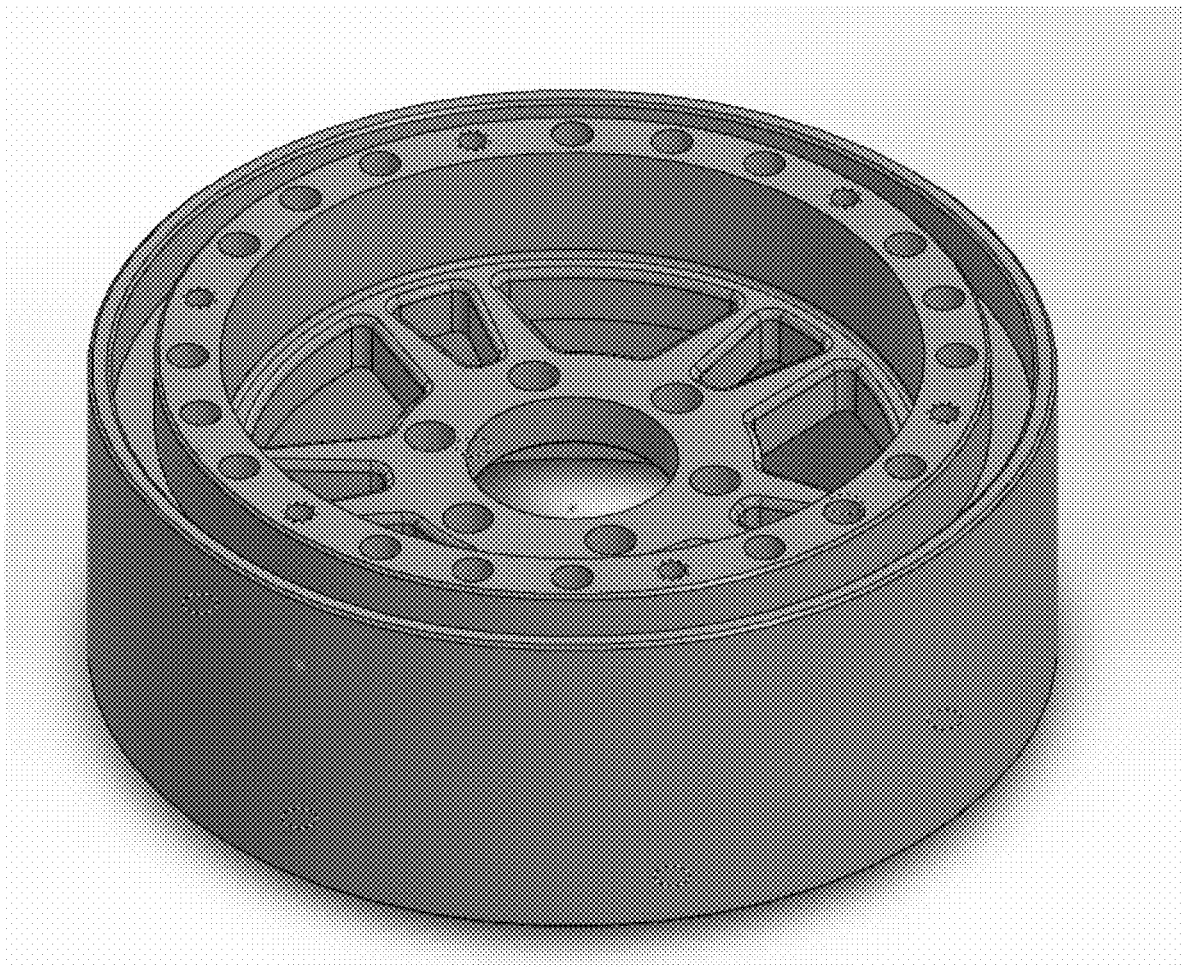
Figure 19:
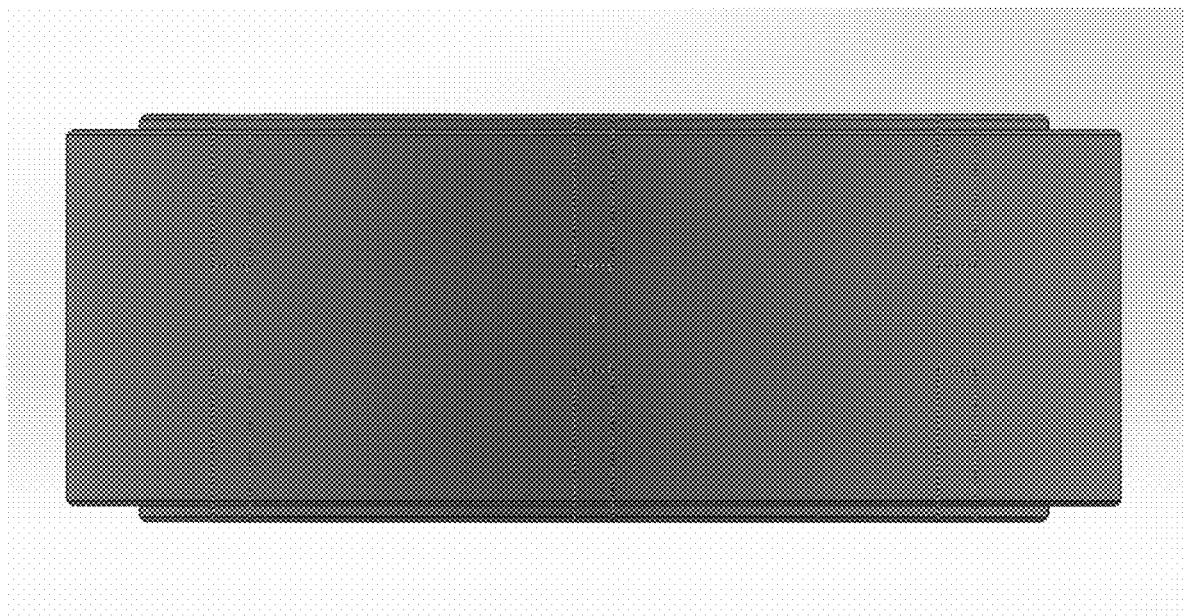
Figure 20:
Figure 21:
FIGS. 21-24 depict a various views of a wheel center section of a bead lock wheel line, according to an embodiment.
Figure 22:
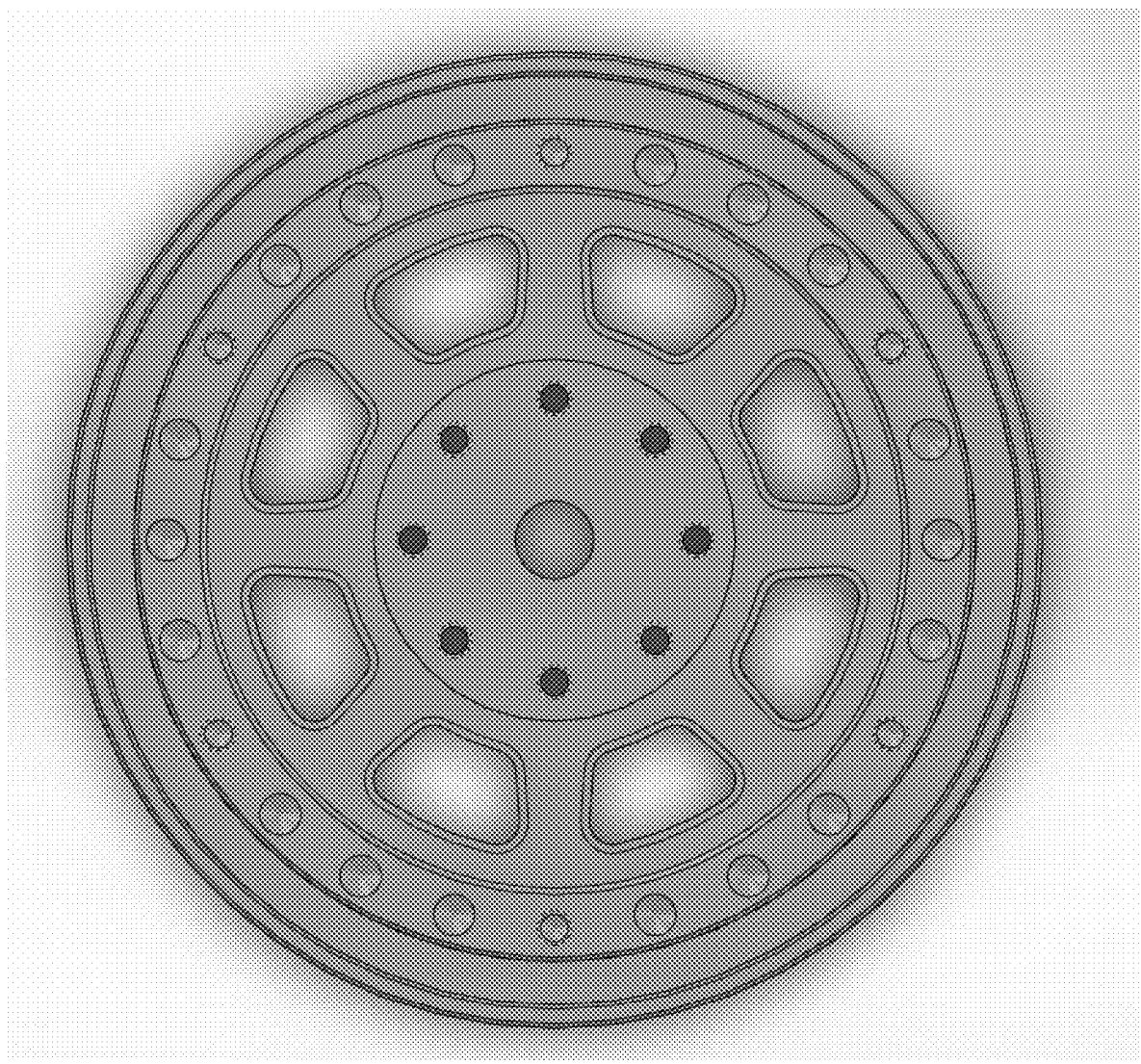
Figure 23:
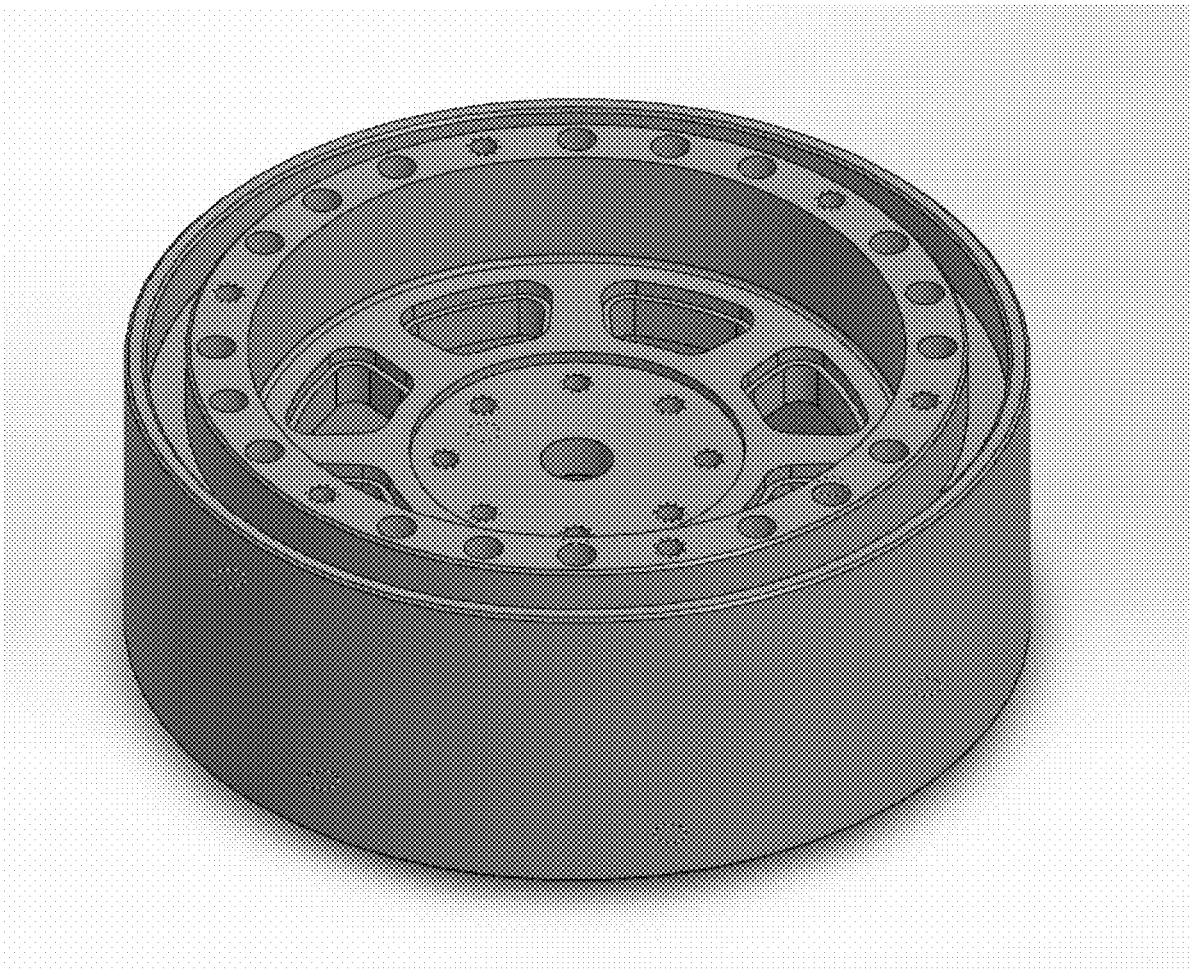
Figure 24:
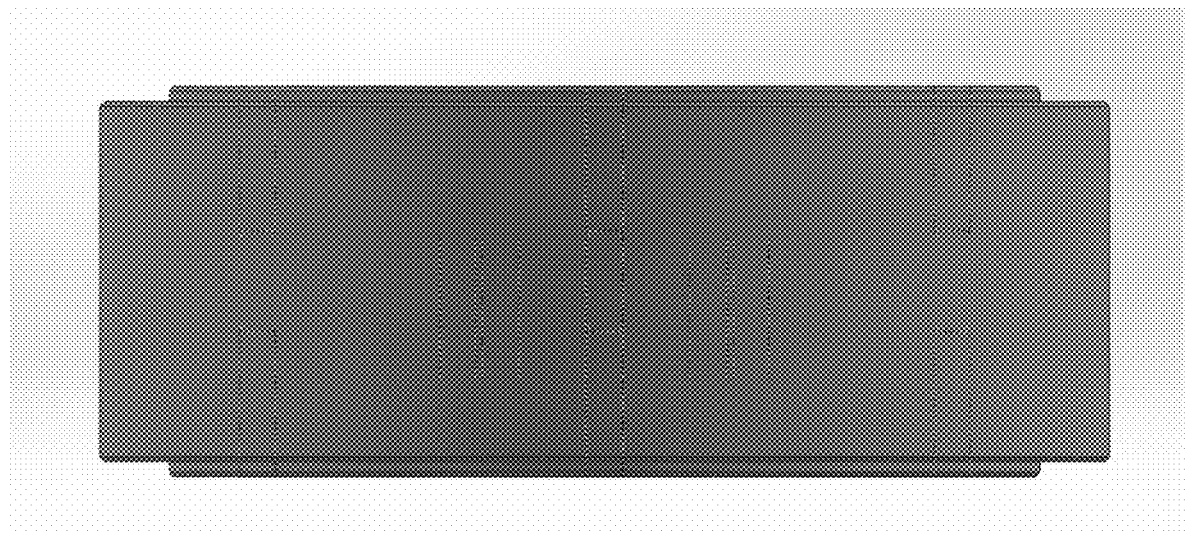

FIG. 12 depicts one embodiment of utilizing a bead lock wheel line. The operations of method 1200 presented below are intended to be illustrative. In some embodiments, method 1200 may be accomplished with one or more additional operations not described, and/or without one or more of the operations discussed. Additionally, the order in which the operations of method 1200 are illustrated in FIG. 12 and described below is not intended to be limiting.

At operation 1210, a bead lock ring may be overlaid onto a wheel center section. The bead lock ring may be configured to be positioned within an outer circumference of the wheel center section.

At operation 1220, pass through holes positioned through the bead lock ring may be moved to align with threaded holes positioned through the wheel center section. Additionally, threaded holes positioned through the bead lock ring may be moved to align with pass through holes positioned through the wheel center section.

At operation 1230, threaded screws may be screwed into the threaded holes positioned through the bead lock ring. Responsive to threading an upper portion of the screws through the pass through holes positioned through the bead lock ring, a lower portion of the screws may be inserted within the pass through holes positioned through the wheel center section.

At operation 1240, an upper portion of threaded screws may be pass through the pass through holes positioned through the bead lock ring, and a lower portion of the threaded screws may be screwed into the threaded holes positioned through the wheel center section. Responsive to coupling the threaded screws into the threaded screws of the wheel center section, the bead lock ring may be coupled to the wheel center section.

FIGS. 13-16 depict a various views of a wheel center section of a bead lock wheel line, according to an embodiment. As depicted in FIGS. 13-16, the wheel center section may include 8 pass through holes that attach to an axle flange. The axle flange may be affixed directly to an axle with a pin and a nut.

FIGS. 17-20 depict a various views of a wheel center section of a bead lock wheel line, according to an embodiment. As depicted in FIGS. 17-20, a center wheel section may include back surface with a milled hex. The milled hex may be configured to receive a wheel hex, which is configured to be affixed directly to an axle with a pin and a nut.

FIGS. 21-24 depict a various views of a wheel center section of a bead lock wheel line, according to an embodiment. As depicted in FIGS. 21-24, a wheel center section may include six pass through holes that are configured to attach to a hex hub. The hex hub includes a milled hex, and may be configured to receive a wheel hex. The wheel hex may be affixed directly to the axle with a pin and a nut.

Figure 25:
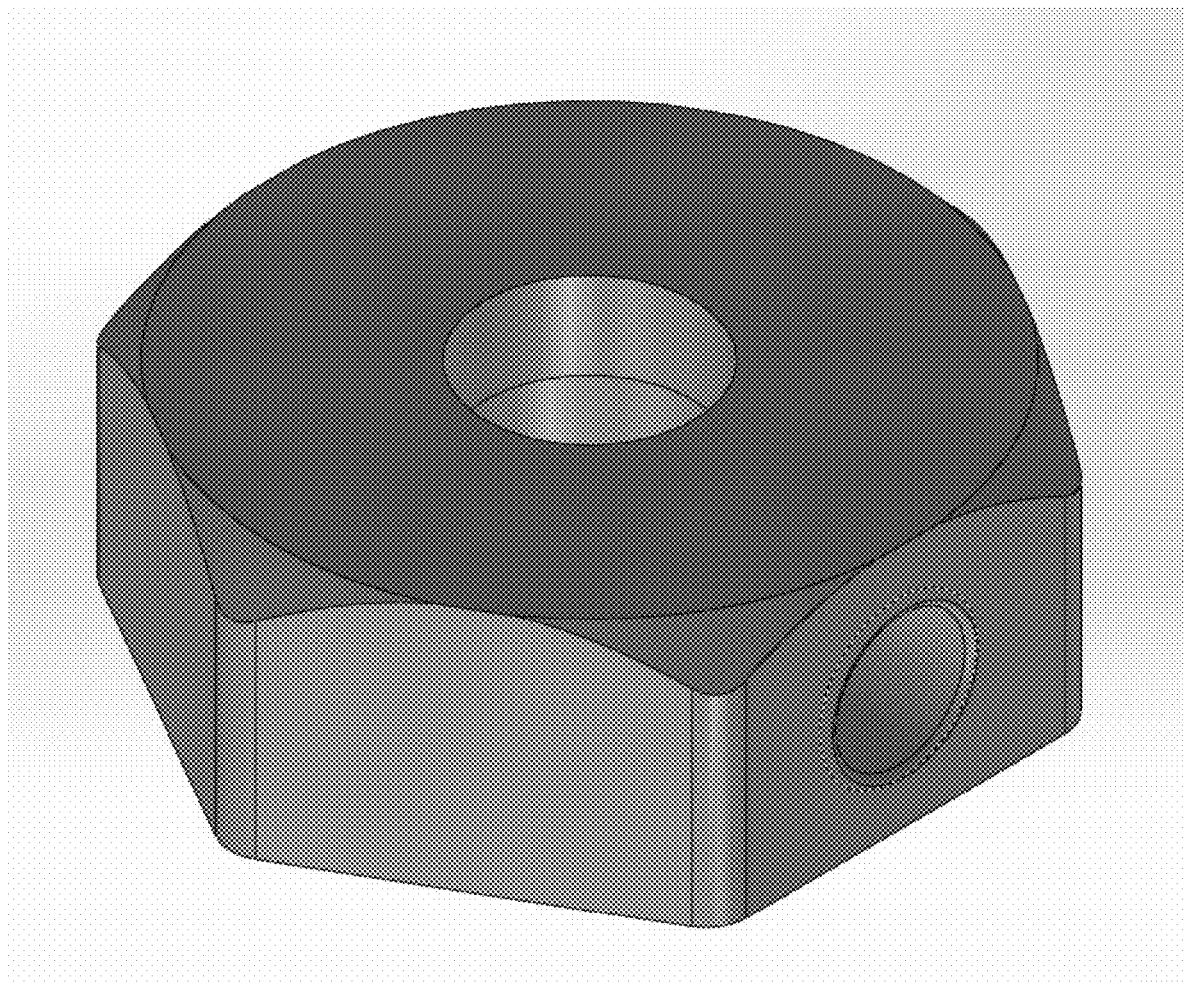
FIGS. 25-26 depict a wheel hex, according to an embodiment.
Figure 26:
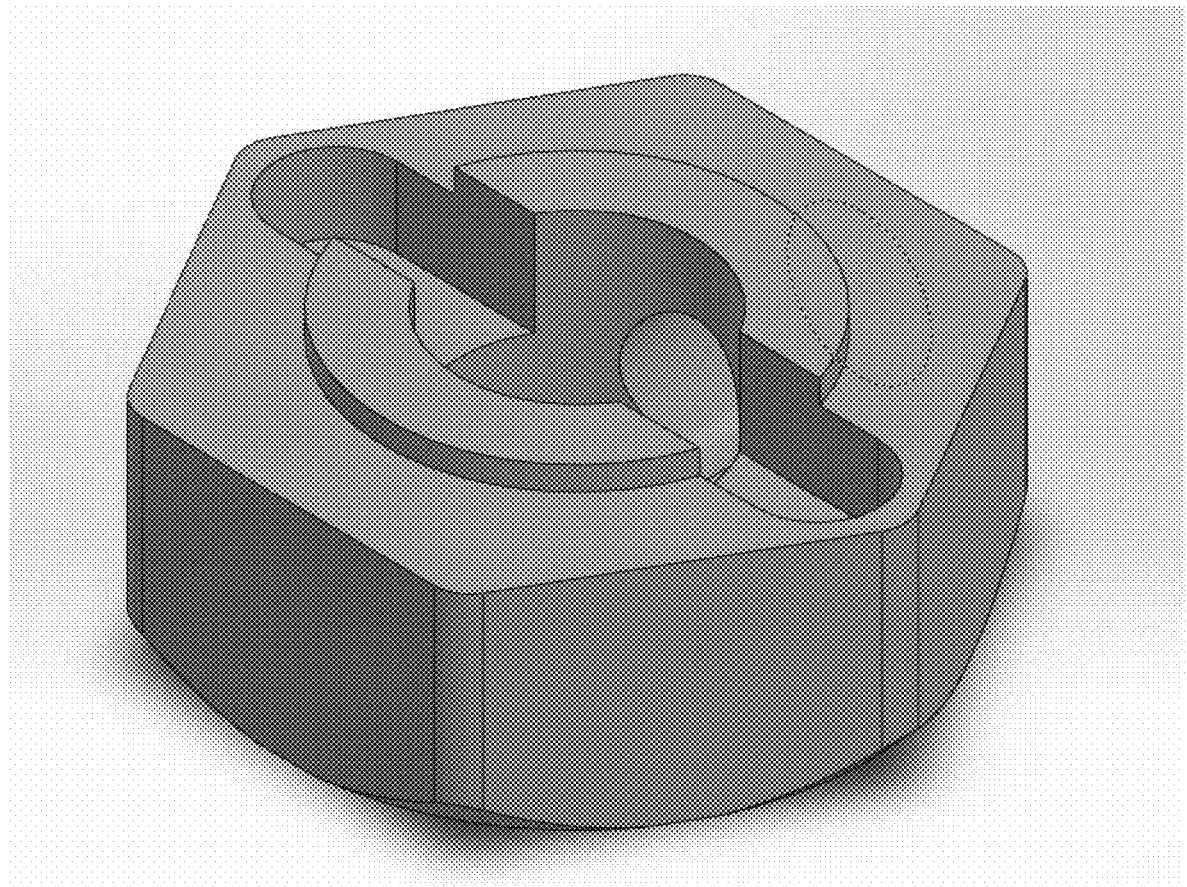

FIGS. 25-26 depict a wheel hex, according to an embodiment.

Figure 27:
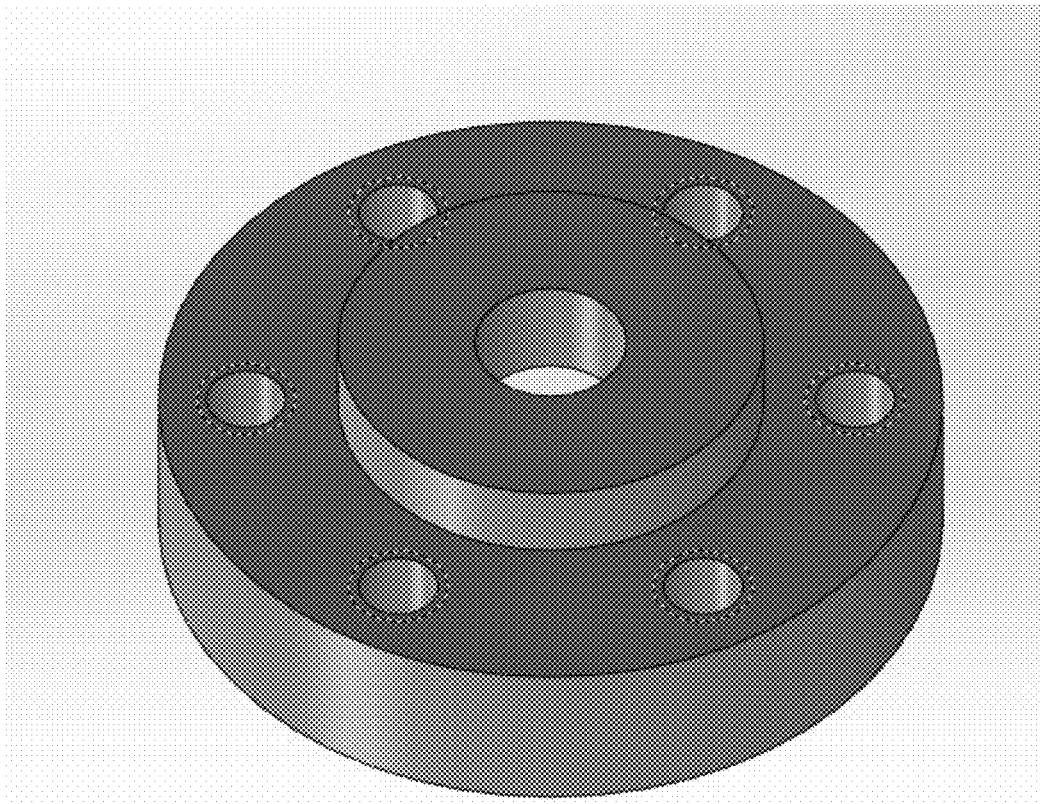
FIGS. 27-28 depict a hex hub according to an embodiment.
Figure 28:
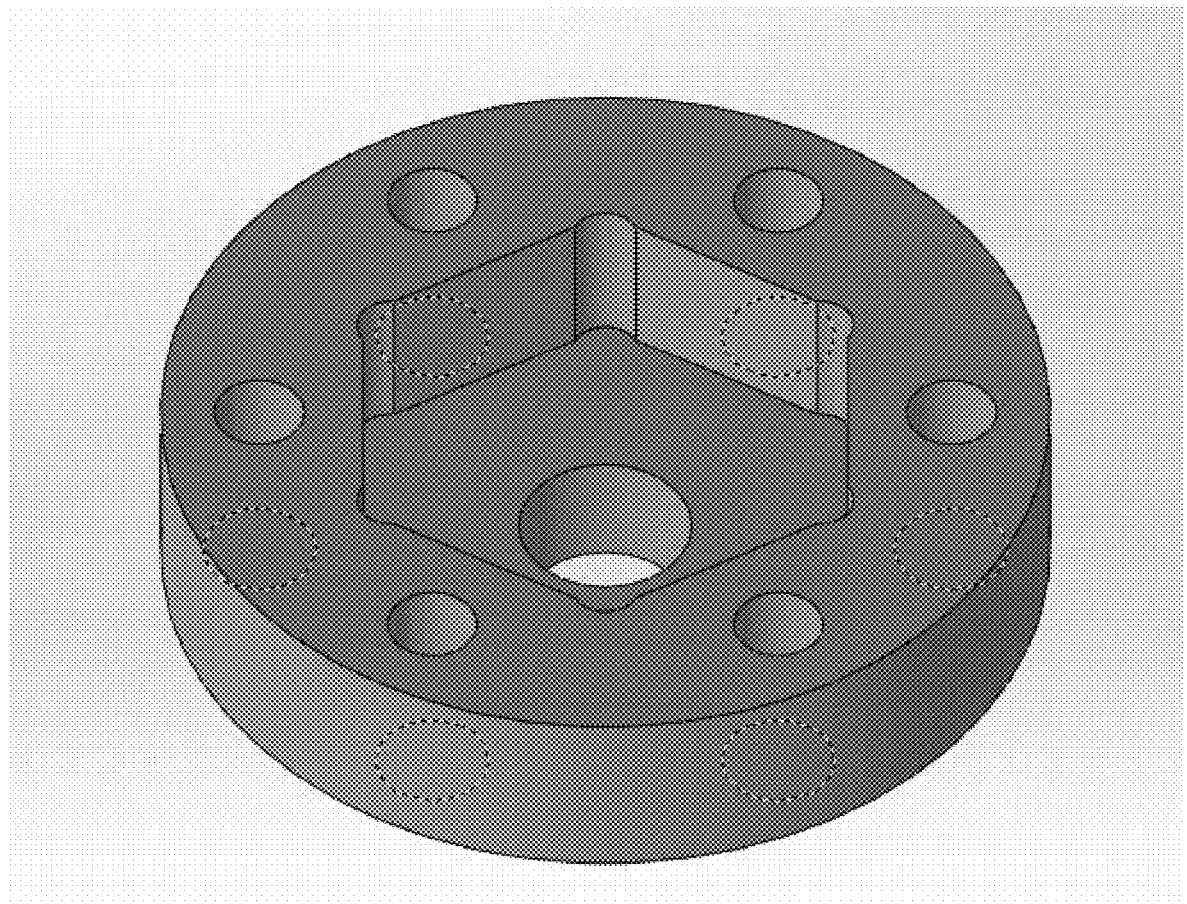

FIGS. 27-28 depict a hex hub according to an embodiment.

Figure 29:
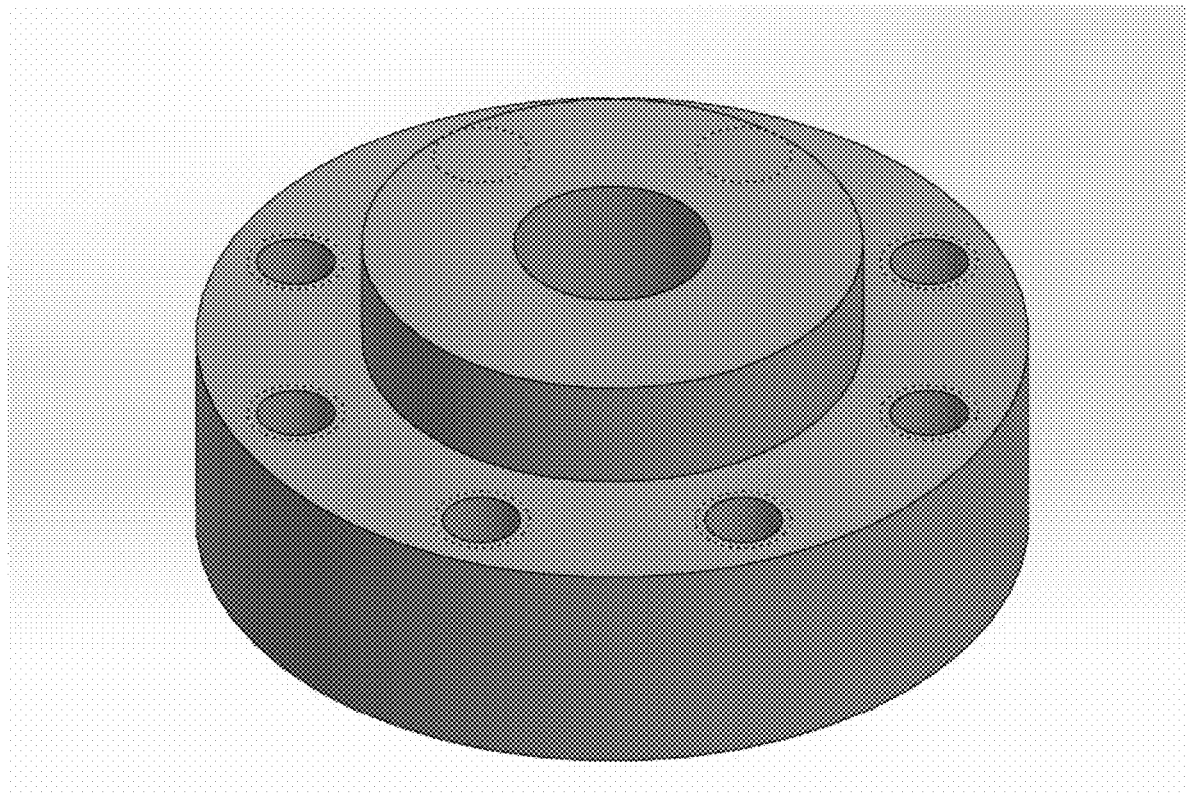
FIGS. 29-30 depict an axle flange, according to an embodiment.
Figure 30:
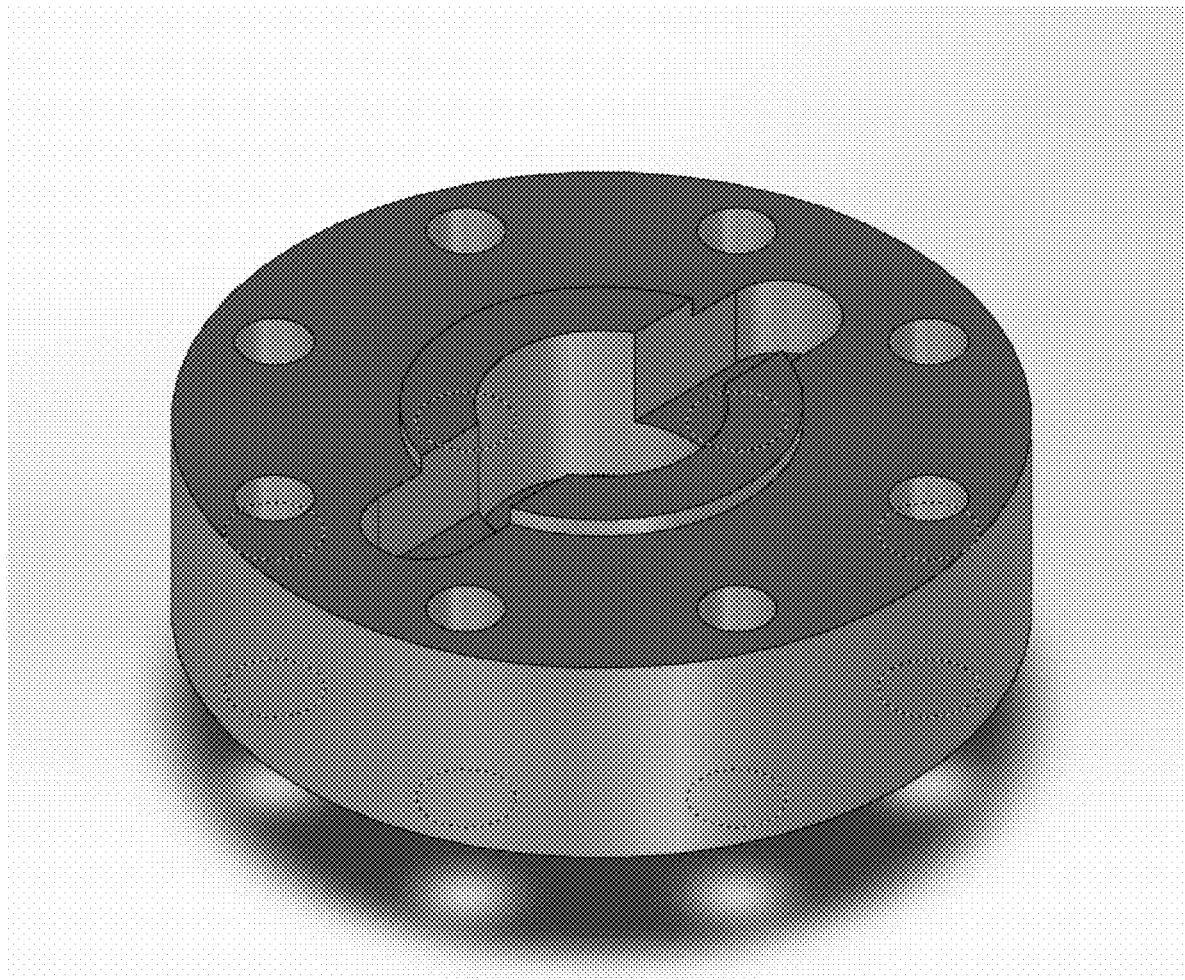

FIGS. 29-30 depict an axle flange, according to an embodiment.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

The invention claimed is:

1. A locking system comprising:
   a bead lock ring including first holes and second holes, the first holes and the second holes being different type of holes, the first holes having a first face and a second face, the first face having a first diameter and the second face having a second diameter, the first diameter being a different size than the second diameter;
   the second holes having a third face and a fourth face, the third face having the first diameter and the fourth face having a third diameter, the third diameter being a different size than the second diameter and the first diameter.

2. The locking system of claim 1, wherein the first holes are threaded holes and the second holes are non-threaded pass through holes.

3. The locking system of claim 2, wherein there is a different number of first holes than second holes.

4. The locking system of claim 3, wherein there are a plurality of second holes positioned between the first holes.

5. The locking system of claim 1, wherein the bead lock ring is cylindrical in shape.

6. The locking system of claim 5, wherein the first holes and the second holes are positioned between an inner diameter and an outer diameter of the bead lock ring.

7. The locking system of claim 1, wherein the bead lock ring is configured for a scaled model of a vehicle.

8. The locking system of claim 7, wherein the bead lock ring is configured to be aligned with a wheel center section of the scaled model of the vehicle.

9. The locking system of claim 8, wherein a first height of the wheel center section is greater than a second height of the bead lock ring.

10. The locking system of claim 8, wherein the wheel center section includes third holes, the third holes being threaded holes.

11. The locking system of claim 10, wherein the third holes are configured to align with the second holes.

12. The locking system of claim 11, further comprising:
   coupling mechanisms configured to extend through the second holes and the third holes.

13. The locking system of claim 12, wherein the coupling mechanisms are screws.

* * * * *